(12) United States Patent
Fuller

(10) Patent No.: US 11,097,177 B1
(45) Date of Patent: *Aug. 24, 2021

(54) REPULSION-BASED SWIM SYSTEM AND METHODS FOR USE THEREOF

(71) Applicant: ORKUS SWIM LLC, Cape Coral, FL (US)

(72) Inventor: Kip Fuller, Estero, FL (US)

(73) Assignee: Orkus Swim LLC, Cape Coral, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 17/167,823

(22) Filed: Feb. 4, 2021

Related U.S. Application Data

(63) Continuation-in-part of application No. 17/037,080, filed on Sep. 29, 2020, now Pat. No. 10,912,977.
(60) Provisional application No. 63/070,184, filed on Aug. 25, 2020.

(51) Int. Cl.
*A63B 69/12* (2006.01)
(52) U.S. Cl.
CPC ........ *A63B 69/125* (2013.01); *A63B 2208/03* (2013.01)
(58) Field of Classification Search
CPC ....... A63B 69/00; A63B 69/12; A63B 69/125; A63B 69/14; A63B 2208/03
See application file for complete search history.

(56) References Cited

U.S. PATENT DOCUMENTS

| | | | | |
|---|---|---|---|---|
| 2,312,976 A | * | 3/1943 | Pels | A63B 35/00 440/38 |
| 3,329,118 A | * | 7/1967 | Strader | A63B 35/12 114/315 |
| 3,556,438 A | * | 1/1971 | Meditz | B64C 39/026 244/4 A |
| 3,916,814 A | * | 11/1975 | Bardoni | A63B 35/12 114/315 |
| 4,379,532 A | * | 4/1983 | Dmitrowsky | B64C 39/026 244/4 A |

(Continued)

FOREIGN PATENT DOCUMENTS

KR  10-0967491  7/2010

OTHER PUBLICATIONS

Notice of Allowance dated in U.S. Appl. No. 17/037,080, dated Dec. 18, 2020.

*Primary Examiner* — Garrett K Atkinson
(74) *Attorney, Agent, or Firm* — Gardella Grace P.A.

(57) ABSTRACT

In one aspect, a swim system may include a reverse thrust system worn by a swimmer proximate the frontal upper torso. The system provides a variable amount of reverse thrust such that the user can swim-in-place or make gradual forward progress. Importantly, this may enable a user to effectively "extend" a small residential pool to serve the same function as a twenty-five meter pool typically found at commercial or government facilities. The system also provides laminar current under the user while swimming, which solves the problems of "leg drop," the need to "out-kick" the arm stroke, and turbulence and wave action around the head associated with conventional swim-in-place devices. Still further, in certain embodiments the system provides a relatively strong current in the region of the arm stroke moving away from the swimmer which provides enhanced "resistance" for proficient swimmers.

20 Claims, 16 Drawing Sheets

(56) References Cited

U.S. PATENT DOCUMENTS

| | | | | |
|---|---|---|---|---|
| 4,843,998 | A * | 7/1989 | Parker | A63B 35/12 |
| | | | | 114/315 |
| 4,996,938 | A * | 3/1991 | Cameron | A63B 35/12 |
| | | | | 114/315 |
| 5,365,868 | A * | 11/1994 | Culotta | A63B 35/12 |
| | | | | 114/315 |
| 5,685,723 | A * | 11/1997 | Ladin | A63B 69/12 |
| | | | | 368/10 |
| 5,697,792 | A * | 12/1997 | Ladin | A63B 33/002 |
| | | | | 434/254 |
| 5,947,782 | A * | 9/1999 | Siladke | A63H 23/10 |
| | | | | 441/129 |
| D416,225 | S * | 11/1999 | Robinson | D12/308 |
| 6,033,228 | A * | 3/2000 | Ladin | A63B 33/002 |
| | | | | 434/254 |
| D461,445 | S * | 8/2002 | Nuytten | D12/308 |
| 6,524,145 | B1 | 2/2003 | Arzate | |
| 6,665,789 | B1 * | 12/2003 | Stecker, Sr. | B63C 11/46 |
| | | | | 114/242 |
| 6,823,813 | B2 * | 11/2004 | Mazin | B63C 11/46 |
| | | | | 114/315 |
| 7,000,559 | B2 * | 2/2006 | Mah | B63C 11/46 |
| | | | | 114/315 |
| 7,124,701 | B2 * | 10/2006 | Valente | A63B 35/12 |
| | | | | 114/315 |
| 7,223,143 | B1 * | 5/2007 | Martin | A63B 35/12 |
| | | | | 441/80 |
| 7,258,301 | B2 * | 8/2007 | Li | B63B 34/10 |
| | | | | 244/4 A |
| 7,270,074 | B2 * | 9/2007 | Pradetto | B63C 11/46 |
| | | | | 114/315 |
| 7,328,669 | B2 * | 2/2008 | Adams | B63C 11/46 |
| | | | | 114/274 |
| 7,331,833 | B2 | 2/2008 | Burgess, Jr. | |
| 7,353,767 | B2 * | 4/2008 | Taelman | B63C 11/02 |
| | | | | 114/245 |
| 7,484,687 | B2 * | 2/2009 | Martin | B64C 15/00 |
| | | | | 244/4 A |
| 7,527,011 | B2 * | 5/2009 | Smith | B63C 11/2209 |
| | | | | 114/315 |
| 7,740,418 | B2 * | 6/2010 | Adams | B63C 11/46 |
| | | | | 405/186 |
| 7,753,750 | B2 * | 7/2010 | Gutierrez | B63C 9/1255 |
| | | | | 441/80 |
| 8,517,781 | B1 * | 8/2013 | Mariansky | B63C 11/02 |
| | | | | 440/24 |
| 8,651,041 | B2 * | 2/2014 | Myers | B63C 11/46 |
| | | | | 114/315 |
| 9,138,617 | B2 * | 9/2015 | Duboy | B63C 11/00 |
| 9,295,880 | B2 * | 3/2016 | Mazin | A63B 35/12 |
| 9,440,715 | B2 * | 9/2016 | Rizzo | B63B 32/45 |
| 9,540,090 | B2 * | 1/2017 | Fenu | H04B 10/80 |
| 9,643,704 | B2 * | 5/2017 | Fenu | B63H 23/24 |
| 9,878,211 | B1 * | 1/2018 | Knowles | A63B 35/00 |
| 10,076,696 | B2 * | 9/2018 | Laflamme | A47K 3/10 |
| 10,112,713 | B2 * | 10/2018 | Tyler | B64D 17/40 |
| 10,398,940 | B2 * | 9/2019 | Grosse Austing | A63B 35/12 |
| D869,373 | S * | 12/2019 | Wei | D12/308 |
| D869,374 | S * | 12/2019 | Chen | D12/308 |
| 10,556,151 | B1 * | 2/2020 | Malykhin | B63C 11/46 |
| D897,267 | S * | 9/2020 | Wei | D12/308 |
| 10,793,271 | B2 * | 10/2020 | Demonfort | B64D 5/00 |
| 2004/0094083 | A1 | 5/2004 | Mazin | B63C 11/46 |
| | | | | 114/315 |
| 2006/0081167 | A1 * | 4/2006 | Valente | B63H 11/08 |
| | | | | 114/315 |
| 2006/0081168 | A1 * | 4/2006 | Adams | B63C 11/46 |
| | | | | 114/315 |
| 2006/0260528 | A1 * | 11/2006 | Taelman | B63C 11/46 |
| | | | | 114/315 |
| 2007/0241566 | A1 * | 10/2007 | Kuehnle | F03B 17/061 |
| | | | | 290/53 |
| 2008/0242162 | A1 * | 10/2008 | Smith | B63C 11/2209 |
| | | | | 440/14 |
| 2009/0258554 | A1 * | 10/2009 | Gutierrez | B63C 9/1255 |
| | | | | 441/106 |
| 2013/0031691 | A1 * | 2/2013 | Burga | H01M 50/502 |
| | | | | 2/2.15 |
| 2014/0273672 | A1 * | 9/2014 | Lee | A63B 35/00 |
| | | | | 440/38 |
| 2015/0047548 | A1 * | 2/2015 | Mazin | B63C 11/46 |
| | | | | 114/315 |
| 2015/0111445 | A1 * | 4/2015 | Duboy | B63C 11/46 |
| | | | | 440/6 |
| 2015/0183498 | A1 * | 7/2015 | Wardle | B63C 9/00 |
| | | | | 114/337 |
| 2015/0209622 | A1 * | 7/2015 | Guinyard | A63B 35/08 |
| | | | | 440/38 |
| 2015/0336636 | A1 * | 11/2015 | Fenu | H04B 1/3822 |
| | | | | 114/88 |
| 2015/0336650 | A1 * | 11/2015 | Fenu | B63H 25/02 |
| | | | | 114/315 |
| 2016/0144934 | A1 * | 5/2016 | Rizzo | B63B 32/50 |
| | | | | 441/74 |
| 2017/0100656 | A1 * | 4/2017 | Laflamme | A63B 69/125 |

* cited by examiner

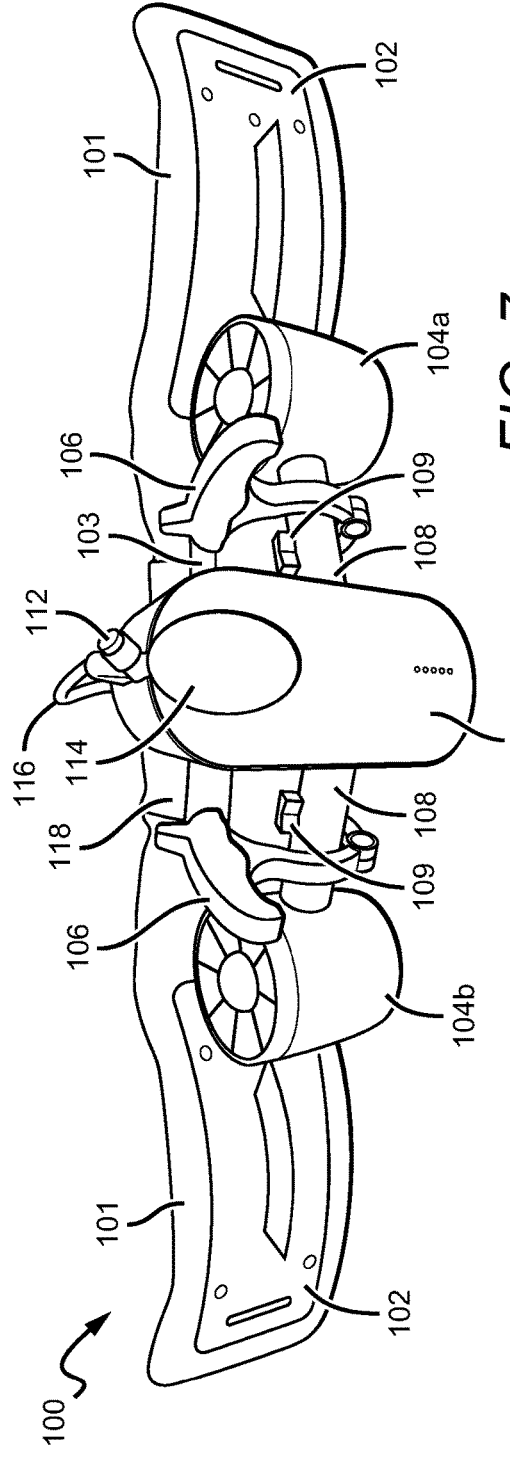
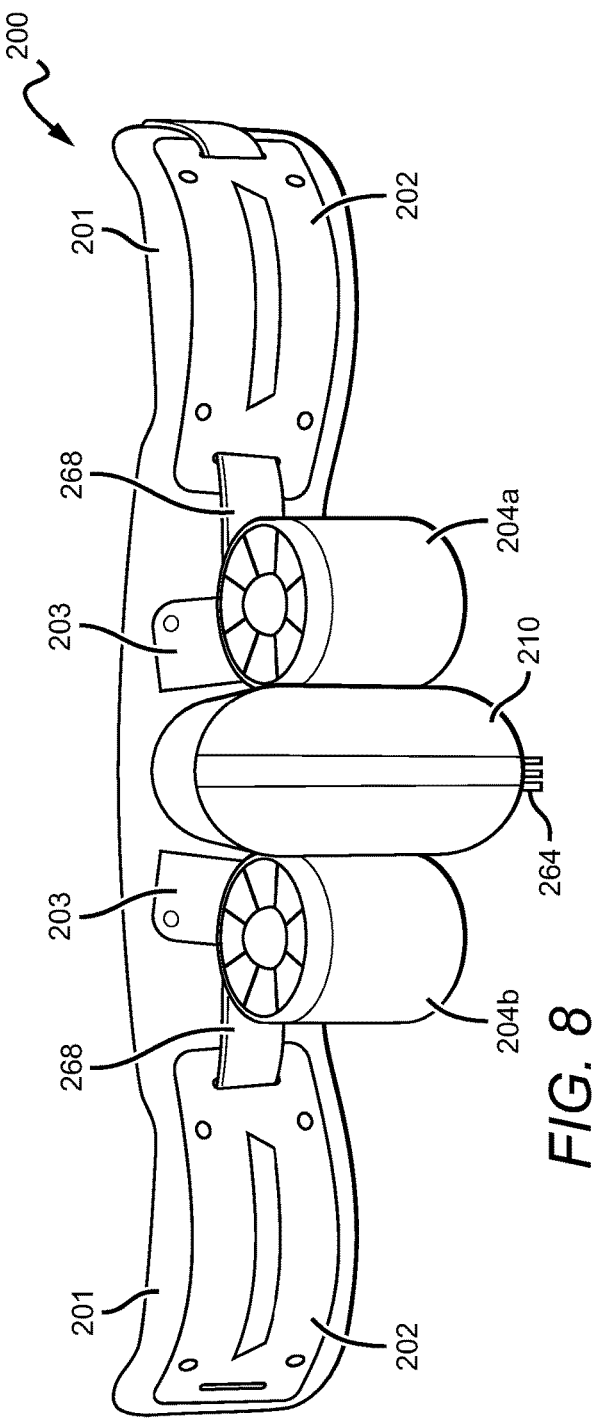

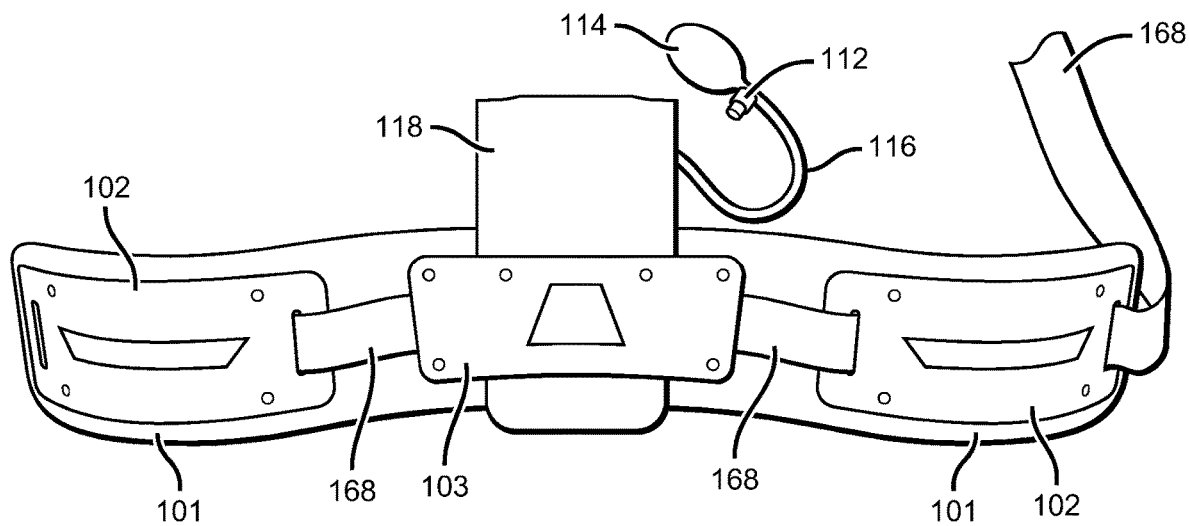
FIG. 9
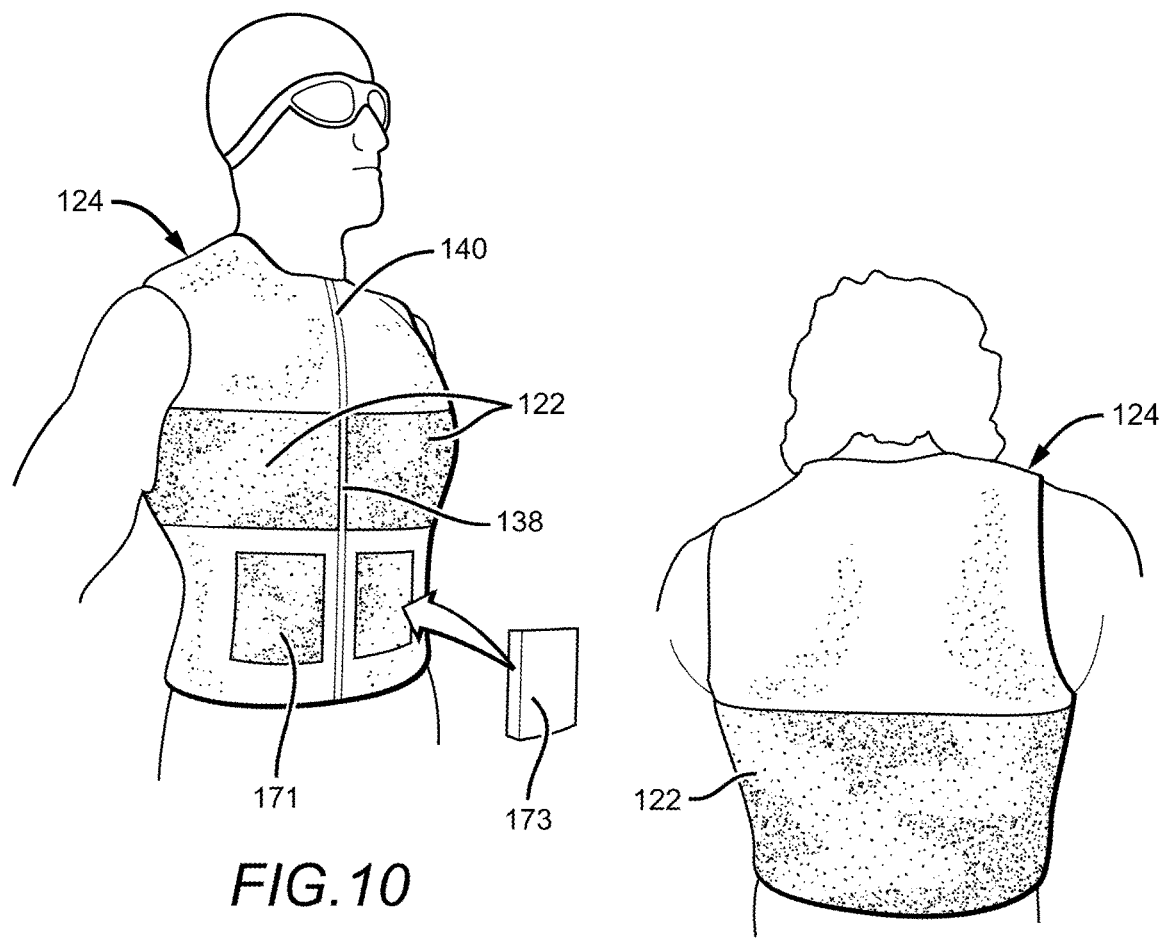
FIG. 10
FIG. 11

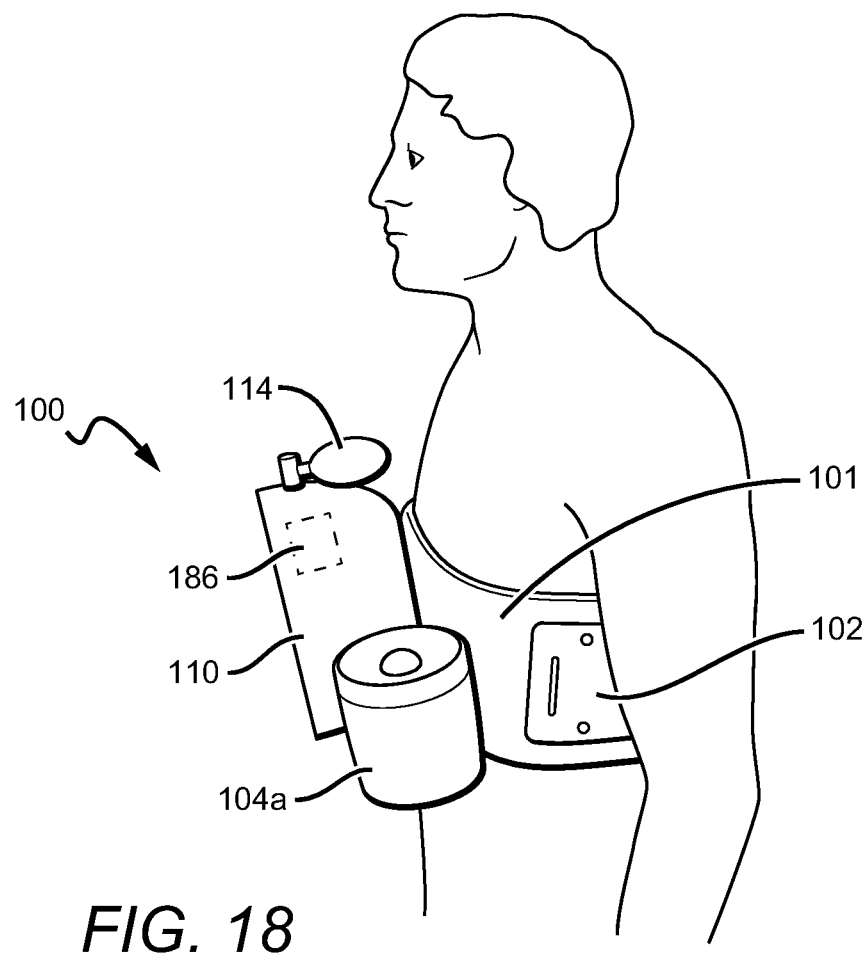
FIG. 18
FIG. 19
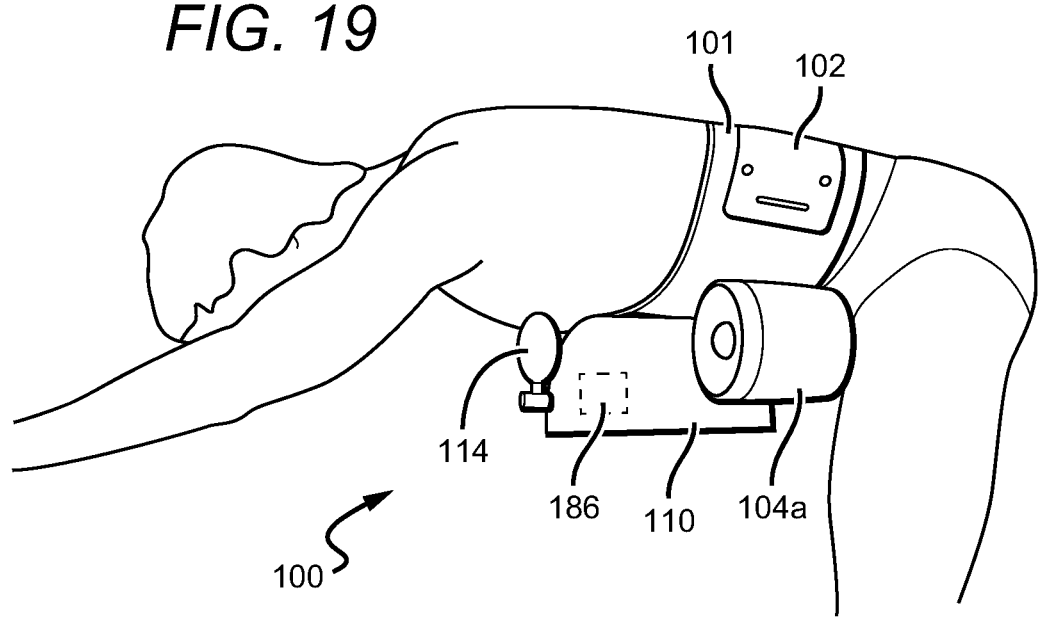

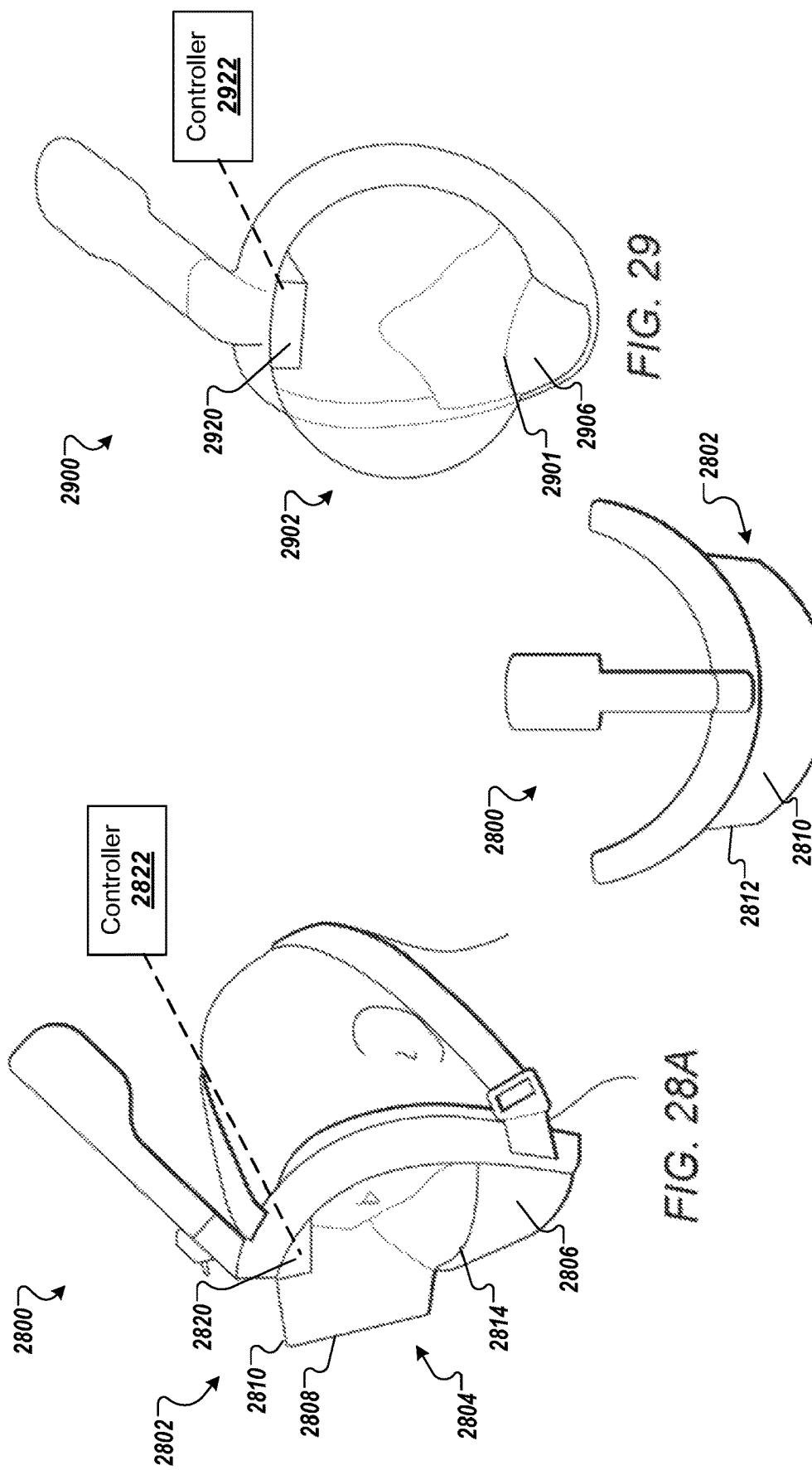

REPULSION-BASED SWIM SYSTEM AND METHODS FOR USE THEREOF

CROSS-REFERENCE TO RELATED APPLICATIONS

The present application is a continuation-in-part application of U.S. patent application Ser. No. 17/037,080 (now U.S. Pat. No. 10,912,977), filed Sep. 29, 2020 and entitled "Repulsion-Based Swim System And Methods For Use Thereof," which claims the benefit and priority of U.S. Provisional Patent Application Ser. No. 63/070,184, filed Aug. 25, 2020 and entitled "Repulsion-Based Swim System And Methods For Use Thereof," which is incorporated herein by reference in its entirety for all purposes.

INCORPORATION BY REFERENCE

Each document cited herein is incorporated by reference in its entirety for all purposes.

BACKGROUND

Swimming, particularly for exercise, is a highly desirable form of exercise but swimming on a regular basis typically involves substantial inconvenience and requires the athlete to tolerate various potentially unpleasant aspects of the swimming experience. Most individuals must travel to a local park, recreation or other exercise facility in order to access a pool of sufficient length, for instance a standard 25-meter lapping pool. Many individuals have smaller pools at their residences, particularly in warmer climates, but these pools are often only about 7-9 meters in length. After a typical swim turn and wall push, the individual might only be able to take a few strokes before arriving at the other side of the pool. Accordingly, even in warmer climates where pool ownership and swimming for exercise are most common, individuals still need to travel to commercial or public facilities to gain access to a pool of sufficient length to enable a meaningful workout.

Experiences at swimming pool facilities are also typically compromised in various ways. Water temperature is often unpredictable, as is lane availability. Long wait times are common and sharing lanes by multiple swimmers is often necessary. Further, hygiene is often an issue and infectious disease transmission is of course possible in a public pool environment. Many swimmers thus seek to avoid commercial or public swimming pools.

Swim-in-place systems are one solution to these problems. Swim-in-place systems are designed to permit a swimmer to "hold station" or remain stationary while swimming in a small body of water such as a small exercise pool or a typical residential recreational pool. Such systems typically come in one of two forms.

The first is a tether system. A tether is attached to a belt or harness that is worn by the swimmer. The other end of the tether is attached to pole or other fixed object, typically outside of the pool. The swimmer begins swimming and is held in place by the tether.

However, tether systems have various disadvantages. First, the swimming experience is not natural because there is no flow of water around the swimmer, particularly under the swimmer. Strokes and kicks are accordingly unnatural in that the swimmer's hands and feet do not experience the same fluid environment as in normal swimming. The swimmer's kicks, for instance, do not provide the usual amount of lift and thus the swimmer's legs drop, which is a suboptimal swimming position. Second, in order to maintain the legs in an elevated and horizontal position, it is necessary for the swimmer to kick more frequently than the arm stroke would require. Therefore, the swimmer usually cannot swim normally in that the kick frequency is outpacing the corresponding appropriate stroke frequency. Stated differently, the swimmer must "out kick" their arm stroke in order to stay horizontal in the water. Third, the difficulty of the swim can only be increased by increasing the power applied to each stroke and kick. If less power is applied by the swimmer, the intensity of the exercise drops accordingly. In normal swimming, the need or desire to reach a destination within a certain time (for instance, the end of the swim lane to achieve a desired lap time) provides a natural motivation and incentive to maintain swimming at higher speeds. With tether systems, a great deal of self-discipline is required to sustain a similar level of difficulty or exertion to that experienced in a normal swimming environment. Fourth, the fact that the swimmer is held in one fixed position tends to cause boredom, diminishing the swimming experience. Fifth, substantial pressure is created by the belt to which the tether is attached, which causes discomfort particularly over long periods of time and for faster swimmers whose strokes produce more thrust.

The second type of swim-in-place system generates a recirculating current into which a swimmer swims in order to hold station. A conventional pool current generator system 158 (hereinafter "current generator") is shown in FIG. 1. Current is emitted from the generator horizontally along the surface of the water and the swimmer 150 strokes at a pace sufficient to counteract the force of the current and stay in position. As illustrated, the current is typically diverted upwardly when it makes contact with the swimmer's head 148. This effect creates a swell or wave of water around the head and there is typically substantial turbulence around the head of the swimmer as well. This makes breathing difficult, and inhalation of water into the mouth, nose and lungs of the swimmer more frequently occurs. Further, greater rotation of the head, neck and torso are typically required to elevate the nose and mouth above the water, and this may be difficult for less skilled swimmers, older swimmers, or swimmers with injuries.

Also, as with the tether-based system, the swimmer must kick very quickly—faster than called for by the arm stroke frequency—in order to stay horizontal in the water. This is sometimes called "out kicking" the arm stroke. The minimal flow under the swimmer's legs means that more kicks are required in order to maintain the legs in an elevated and horizontal position. Therefore, the swim experience is unnatural and fails to promote proper technique.

Another problem associated with current generator systems is the fact that even when out-kicking the arm stroke, swimmers still have a difficult time keeping their legs elevated, as required to achieve correct swimming form. Two primary factors contribute to this "leg drop." First, the current typically is minimal under the legs of the swimmer. The current generator 158 will usually create a strong current near the water surface and extending down to a depth of only several inches. That current 144 is substantially impeded when it encounters the head and shoulders of the swimmer. A weakened current will flow along the underside of the swimmer, but even this current trails off substantially as it progresses to the left in FIG. 1 due in part to dissipation of the current into the adjacent stationary water. Also, the feet of the swimmer are often close to a rear wall 152 of the pool and the water in this area often becomes highly turbulent due to the kicking action of the swimmer and rebound of water off the rear wall. The net result is that swimmers find it difficult to maintain the preferred horizontal swimming orientation because their legs drop too far into the water even when out-kicking the arm stroke.

As used herein, the term "turbulence" or "turbulent" refers not only to fluid motion that is non-laminar, irregular and characterized by chaotic changes in pressure and flow velocity, but also the accompanying cavitation. Cavitation occurs when water pressure is lowered below the water's vapor pressure, forming bubbles of vapor. Cavitation is the formation of vapor cavities in water (small liquid-free zones called "bubbles" or "voids") that are the consequence of forces acting upon the liquid. It usually occurs when a liquid is subjected to rapid changes of pressure that cause the formation of cavities where the pressure is relatively low. That can happen when water is accelerated to high speeds, for example, when an arm stroke or kick enters the water. Cavitation further diminishes the propulsive force provided by a stroke or kick and, again, hereinafter the term turbulence is used to refer to both non-laminar flow and the associated cavitation.

Another problem with current generator systems is that the width of the current lane is typically quite narrow, often only slightly wider than the width of the swimmer's shoulders. The speed of the current also varies substantially across the narrow current lane. The speed is greatest in the center and the speed gradually tapers off at locations spaced apart from the center line. At the edges of the swim lane there are substantial eddy currents as the water in the swim lane current interacts with the surrounding, generally stationary water. Because of this, it is necessary to stay almost perfectly centered in the swim lane or else the amount of forward thrust provided by each right-handed stroke will vary substantially from that provided by a left-handed stroke. That can change the orientation of the swimmer unless the swimmer makes appropriate maneuvers to counteract this effect or regain the center of the lane. These effects can substantially degrade the swimming experience for all but the most proficient swimmers.

Pool current generator systems are also generally quite expensive. Endless Pool brand systems often cost fifteen to thirty thousand dollars, whereas smaller and more portable pool current generators cost between three and ten thousand dollars.

Existing swim-in-place systems thus suffer from various disadvantages. The swim experience is compromised by the absence of appropriate current under the swimmer and turbulence and/or lack of laminar current flow under the legs of the swimmer and in the region around the head and shoulders of the swimmer. Swimmers often experience leg drop, which puts their bodies in a suboptimal position for swimming. Arm strokes generally provide less thrust than normal because the strokes pass through turbulent water.

It is also often difficult to breathe due to waves and turbulence around the head of the swimmer. In the case of a current generator system, it is often difficult to avoid inhaling water. When using tether systems, undue waves and turbulence may be generated around the head due to the absence of incoming laminar current flow, which may lead to the same difficulty.

Further, the desired exertion level may be difficult to maintain. In the case of tether systems, great self-discipline is required to maintain the same exertion level over time and requires kicking out of synchronization with arm strokes. With current generator systems, it is necessary and often difficult to stay exactly in the center of the current lane in order to experience a consistent difficulty or exertion level.

Moreover, conventional systems require that the swimmer remain stationary in the water, which can lead to boredom and an otherwise diminished experience. The sense of satisfaction of completing a lap is missing. Horizontal movement is also missing, which deprives the swimmer of any change in visual scenery during the course of the swim.

Certain embodiments described herein address one or more of the foregoing problems. Certain embodiments which are exemplified herein solve most or all of these problems. However, the scope of the invention is defined by the claims and the foregoing discussion of the shortcomings of the conventional swim-in-place products should not be construed to limit the claims by implication or otherwise. Various embodiments described herein and within the scope of the claims may not solve certain, or any, of the particular problems addressed above. Again, however, the embodiments that are currently most preferred solve many, most or all of these problems.

SUMMARY OF ILLUSTRATIVE EMBODIMENTS

In one aspect, a swim system may include a reverse thrust system worn by a swimmer proximate the upper abdominal area. The system provides a variable amount of reverse thrust such that the user can swim-in-place or make gradual forward progress. Importantly, this may enable a user to effectively "extend" a small residential pool to serve the same function as a twenty-five meter pool typically found at commercial or government facilities. The system also provides laminar current under the user while swimming, which solves the problems of "leg drop," the need to "out-kick" the arm stroke, and turbulence and wave action around the head associated with conventional swim-in-place devices. Still further, in certain embodiments the system provides a relatively strong current in the region of the arm stroke moving away from the swimmer which provides enhanced "resistance" for proficient swimmers.

The inventor also discovered that, counterintuitively, reverse thrust may be provided toward the face of the swimmer in a manner that does not force water into the nose of the swimmer, which creates substantial discomfort and can cause inhalation of water. When reverse thrust is provided along the centerline of the torso, it was found that in many such embodiments water was in fact forced into the swimmer's nostrils. However, embodiments having impeller systems generally aligned with the shoulder sockets of the swimmer provide the aforementioned advantages without creating a strong current proximate the swimmer's nose. While it was expected that providing impeller systems roughly shoulder width apart would interfere with a freestyle stroke, the inventor instead found that the natural bend of the arm during a freestyle stroke generally prevents the arm from touching the impeller system. The inventor also found that the natural twisting or rotation of the body during a freestyle stroke helped avoid interference between the impeller systems and the swimmer's arms.

As used herein, the term "impeller" refers to an apparatus designed to move a fluid by rotation and specifically includes propellers, fans and turbines. In the context of watercraft the term propeller is also sometimes used interchangeably with the term impeller, fan or turbine. The term propeller is accordingly used herein to refer to any apparatus having fins, blades or other structure to move fluid by rotation, including but not limited to turbines, fans and impellers.

Another technical challenge that has been overcome by the illustrative embodiments described herein is provision of means to mount the repulsion system to a swimmer in a manner that avoids uncomfortable pressure points, shifting or movement of the system during use, and impairment of the expansion and contraction of the ribcage during respiration. In one currently preferred embodiment, the user first dons a stretchable band or vest that has hook-and-loop fasteners located on its exterior. The user mounts to that band or vest a repulsion system comprising a center portion having mounted thereon an impeller system and two concave clamshell portions jointedly attached to the center region, each clamshell portion designed to generally conform to one side of the user's ribcage. Each clamshell portion has disposed on its concave surface hook-and-loop pads that positionally correspond to those on the band or vest worn by the user. By simply closing the clamshell portions around the sides of the ribcage, the repulsion system is firmly held in place in a manner that allows expansion and contraction of the user's ribcage. The system thus allows the user to breathe freely, avoids uncomfortable pressure points, and holds the impeller system securely in place. The system can also be readily positioned in a desired vertical position (higher or lower on the chest or abdomen) that best fits a particular user's anatomy. The system can be readily removed by simply pulling outwardly on the two clamshell portions.

The currently preferred embodiments provide laminar flow under the user's legs and shoulders. Provision of two impellers generally aligned with each of the user's shoulders optimally promotes laminar flow under each leg, which substantially avoids the leg drop problem associated with conventional swim-in-place systems. Here again, the natural twist of the upper torso while swimming promotes this function by pulling one impeller system down and toward the centerline of the swimmer and under the legs of the swimmer during at least a portion of a freestyle stroke. This provides increased current flow under the legs. At the same time the other impeller system is pushed further away from the centerline of the swimmer, thereby increasing the laminar current flow in the area of the arm strokes, which improves the effectiveness of each stroke. In this fashion the reverse propulsion system can provide optimally increased current under both the legs of the swimmer and both arm stroke regions without directing any uncomfortable current at the mouth and nose of the swimmer.

The currently preferred twin impeller systems thus provide generally laminar current under each of the swimmer's shoulders and legs, which improves the swim experience and facilitates breathing. Such a multi-impeller system also provides the advantage of reducing the profile or height of the device.

The provision of such laminar flow is substantially improved in some embodiments by positioning the impellers approximately four to six inches beneath the abdomen of the user (when in a horizontal swimming position). This configuration avoids the boundary layer effects associated with the flow of fluid in the immediate vicinity of the swimmer's body. Providing the impellers this additional distance from the centerline or head-to-toe axis of the swimmer has the additional benefit creating rotational torque which can tend to lift the user's legs. However, the torque can also create an uncomfortable pressure point on the user's abdomen, which can be counteracted and addressed by providing the jointed clamshell type mounting apparatus as described herein. Use of a multi-impeller system may advantageously reduce the torqueing effect by reducing the distance between the centerline of the swimmer and the axis of repulsion.

Optimal horizontal orientation may be further promoted by the use of air bladders or impeller thrust vectoring. Air bladders may be provided in the center portion of the device described above, which provides the dual benefits of providing lift and tightening the fit of the reverse propulsion system on the user. The thrust from the impellers also may be vectored slightly downward, which approach provides lift for the swimmer's legs as well as a means to control the amount of rearward thrust. For example, a two-speed motor may provide almost infinitely variable rearward thrust by partially vectoring the thrust downwards or sideways (to the left and right of the swimmer).

In another aspect, the illustrative embodiments of the swim system address the shortcoming of conventional swim-in-place devices that swimmers must remain stationary during the entire swim. In certain embodiments, the user may throttle the reverse thrust such that the user traverses a small residential pool in the same number of strokes as would be needed to traverse one length of a twenty-five or fifty meter pool (e.g., about twenty-five or fifty strokes). The user may thus enjoy a traditional swimming experience without the need to travel to a facility with a large pool or to tolerate the disadvantages associated with public pool environments.

In one currently preferred method of use, the swimmer first selects an amount of reverse thrust that permits the swimmer to make slow forward progress against the reverse thrust. Upon starting to swim, the user's torso and thus the swim system will assume a generally horizontal position. Upon detection of that substantially horizontal orientation, the impeller systems begin to spin and provide the selected amount of reverse thrust. In one example, the swimmer requires forty strokes to traverse a seven meter residential swimming pool, thereby effectively extending the residential swimming pool to serve the same purposes as a twenty-five meter or longer lapping pool. Upon reaching the end of the lane, the swimmer performs a non-flipping turn in which the upper torso assumes a generally upright or vertical position. When in that position the reverse thrust is deactivated until the swim system detects that it has returned to a horizontal or swimming position. After pushing off the wall, the swimmer regains this orientation and the reverse propulsion system reactivates.

The resulting swim experience may actually be superior to that of a traditional full-size lapping pool because of the current provided under the legs and in the arm stroke regions. This current tends to reduce turbulence and increase the force or repulsion generated by each stroke or kick. The swimmer may also find it easier to maintain the proper stroke form and body position, due in part to the manner in which the swim system overcomes the leg drop problem.

In further applications, the swim system may enable substantially enhanced and interactive training experiences. For example, the system may provide varying reverse thrust over time in coordination with coaching or training audible messages requesting the swimmer to sprint for a certain period of time. In this fashion, the swimmer may be provided with interactive and interesting swim exercise routines. When further used in connection with a smart watch and associated application running thereon, the swim system may track strokes and laps (e.g., by detecting the turn sequence described above) and by factoring in the amount of reverse thrust provided over time, inform the swimmer of the equivalent distance traveled or equivalent number of 25 meter laps completed.

The foregoing general description of the illustrative implementations and the following detailed description thereof are merely exemplary aspects of the teachings of this disclosure and are not restrictive. As noted above, certain embodiments within the scope of this disclosure and the claims may not provide the particular advantages set forth above. That said, the most preferred embodiments provide many, most or all of the foregoing advantages relative to conventional swim-in-place devices.

BRIEF DESCRIPTION OF THE DRAWINGS

The accompanying drawings, which are incorporated in and constitute a part of the specification, illustrate one or more embodiments and, together with the description, explain these embodiments. The accompanying drawings have not necessarily been drawn to scale. Any values or dimensions illustrated in the accompanying graphs and figures are for illustration purposes only and may or may not represent actual or preferred values or dimensions. Where applicable, some or all features may not be illustrated to assist in the description of underlying features. In the drawings:

FIGS. 7-8 are further illustrations of the first and second embodiments of a swim system, respectively, not attached to or borne by a swimmer and with its belt system in an open position;

FIG. 9 is an illustration of the manner in which an air bladder system may be incorporated into the swim system;

FIGS. 10-11 are illustrations of a vest for use in combination with the system;

FIGS. 18-19 are illustrations of upper torso orientations in which the impellers are deactivated or activated, respectively, by orientation detecting means;

FIGS. 28A-28B are illustrations of a snorkel mask for use in combination with the system; and FIG. 29 is an illustration of a snorkel mask for use in combination with the system.

DETAILED DESCRIPTION OF ILLUSTRATIVE EMBODIMENTS

Figure 1:
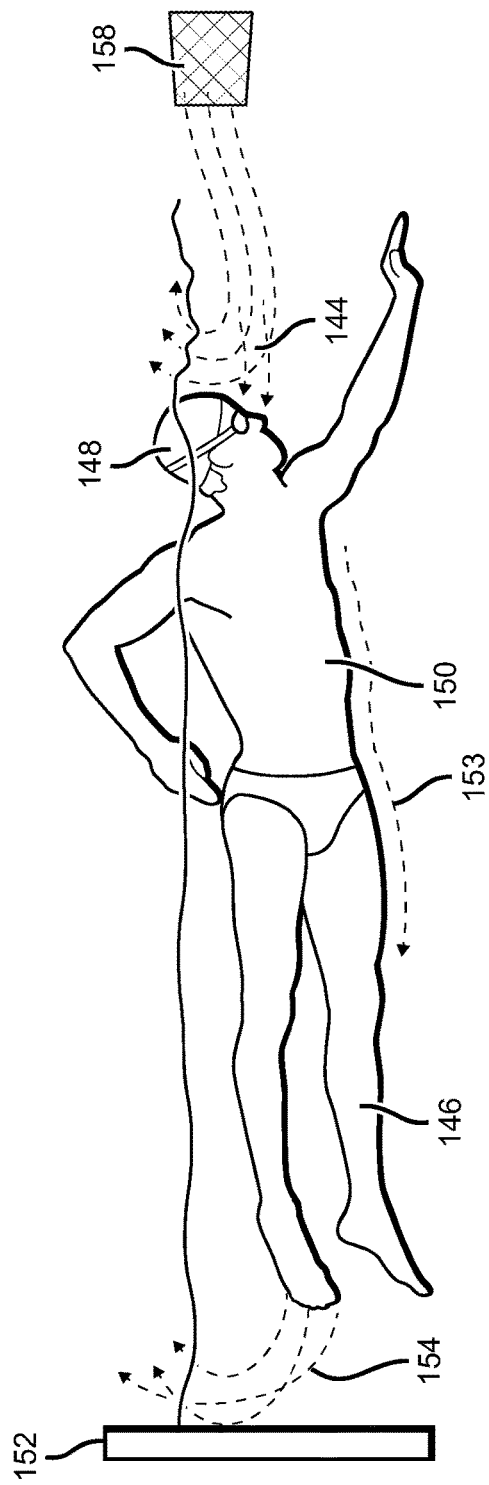
FIG. 1 is an illustration of a conventional current generator swim-in-place system.

The description set forth below in connection with the appended drawings is intended to be a description of various illustrative embodiments of the disclosed subject matter. Specific features and functionalities are described in connection with each illustrative embodiment; however, it will be apparent to those skilled in the art that the disclosed embodiments may be practiced without each of those specific features and functionalities.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments. Further, it is intended that embodiments of the disclosed subject matter cover modifications and variations thereof.

All patents, applications, published applications and other publications referred to herein are incorporated by reference for the referenced material and in their entireties.

It must be noted that, as used in the specification and the appended claims, the singular forms "a," "an," and "the" include plural referents unless the context expressly dictates otherwise. That is, unless expressly specified otherwise, as used herein the words "a," "an," "the," and the like carry the meaning of "one or more." Additionally, it is to be understood that terms such as "left," "right," "top," "bottom," "front," "rear," "side," "height," "length," "width," "upper," "lower," "interior," "exterior," "inner," "outer," and the like that may be used herein merely describe points of reference and do not necessarily limit embodiments of the present disclosure to any particular orientation or configuration. Furthermore, terms such as "first," "second," "third," etc., merely identify one of a number of portions, components, steps, operations, functions, and/or points of reference as disclosed herein, and likewise do not necessarily limit embodiments of the present disclosure to any particular configuration or orientation.

Furthermore, the terms "approximately," "about," "proximate," "minor variation," and similar terms generally refer to ranges that include the identified value within a margin of 20%, 10% or preferably 5% in certain embodiments, and any values therebetween.

Where numerical values are provided, it is to be expressly understood that any values therebetween may be used as well. For instance, a recitation of about 2, 3, 4, or 5 units is intended to include values therebetween, such as about 3-4 units.

The foregoing general description of the illustrative implementations and the following detailed description thereof are merely exemplary aspects of the teachings of this disclosure and are not restrictive. As noted above, certain embodiments within the scope of this disclosure and the claims may not provide the particular advantages set forth above. That said, the most preferred embodiments provide many, most or all of the foregoing advantages relative to conventional heat-not-burn and vaping devices.

Figure 2:
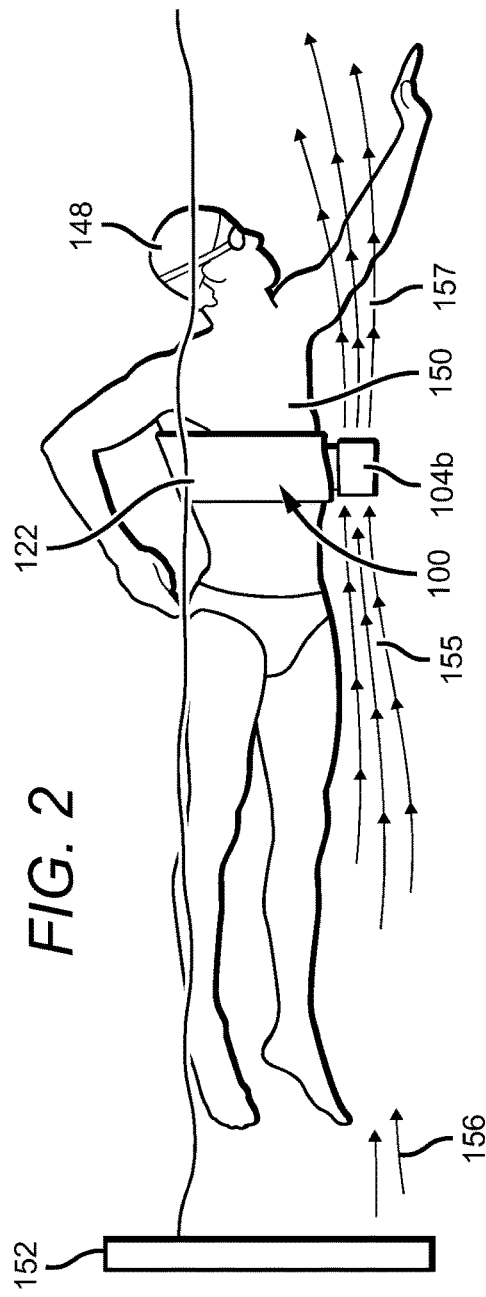
FIG. 2 is an illustration of current flows associated with various embodiments of the swim system.

FIG. 1 is an illustration of a conventional current generator swim-in-place system, which has been addressed above. FIG. 2 is an illustration of current flows associated with various embodiments of the swim system. The impeller system provides substantially laminar flow under the legs of the user, under the user's torso 150 and under and around the user's head 148. This laminar flow provides lift and substantially improves the effectiveness or thrust provided by each stroke or kick. Improving kick effectiveness tends to raise the legs to an elevated position, as shown, which is preferred. In contrast to conventional swim-in-place systems, there is no wave build-up or turbulence around the head of the swimmer that may tend to cause the swimmer to inhale water unintentionally.

Importantly, this flow is in the opposite direction of the swimmer's stroke and thus there is no need for the swimmer to stroke quickly to "overtake" the flow of water, as in conventional current generator systems such as that depicted in FIG. 1. In order for the swimmer to encounter full or "normal" resistance in a conventional current generator system, it is necessary for the swimmer to stroke very quickly, since the current is already flowing past the swimmer, in the same direction as the strokes. Each stroke must therefore be quicker than normal to offset the effect of the direction of the current 144/153. If the current is moving past the swimmer at 2 mph, then each stroke must be 2 mph faster than normal in order to achieve normal resistance and stroke feel.

In contrast, the swim system described herein reverses the direction of that current and the swimmer is able to experience full or normal resistance at a stroke speed that is less than normal. If the flow provided by the impellers is 2 mph in the stroke paths, the swimmer may stroke 2 mph slower than normal and still get a full or normal workout (or resistance level).

Another aspect of the swim systems described herein is that one need not swim-in-place, as with conventional systems. By selecting an appropriate reverse thrust or impeller speed, the user may make gradual forward progress with each stroke. Importantly, this may enable the user to effectively extend a relatively short residential pool to serve the same purpose as a 25 or 50 meter lap pool.

A proficient swimmer will travel approximately one meter per stroke and may travel three meters or more during a wall push-off. For a 6 meter residential swimming pool, a proficient swimmer may only need two to three strokes to reach the other side of the pool, which makes residential pools generally unsuitable for training or swimming laps for exercise.

By selecting a first reverse thrust, the user needs approximately twenty-five strokes to reach the other side of a 6 meter residential swimming pool. By selecting a second, greater reverse thrust, the user needs approximately fifty strokes to reach the other side of a 6 meter residential swimming pool. The swim systems described herein can thus be used to swim as effectively in a relatively small residential pool just as a public or commercial 25 or 50 meter swimming pool.

Alternatively, the user can remain stationary if desired. The user may select a reverse thrust that matches his or her desired swim effort, in which case the user will remain stationary as will conventional swim-in-place systems but with a much-improved swimming experience. As explained, the laminar flow under the legs and torso and proximate the user's head substantially facilitates proper swim form, obviates the need to "outkick" ones arm stroke to keep the feet elevated, and makes it easier to breathe.

Figure 3:
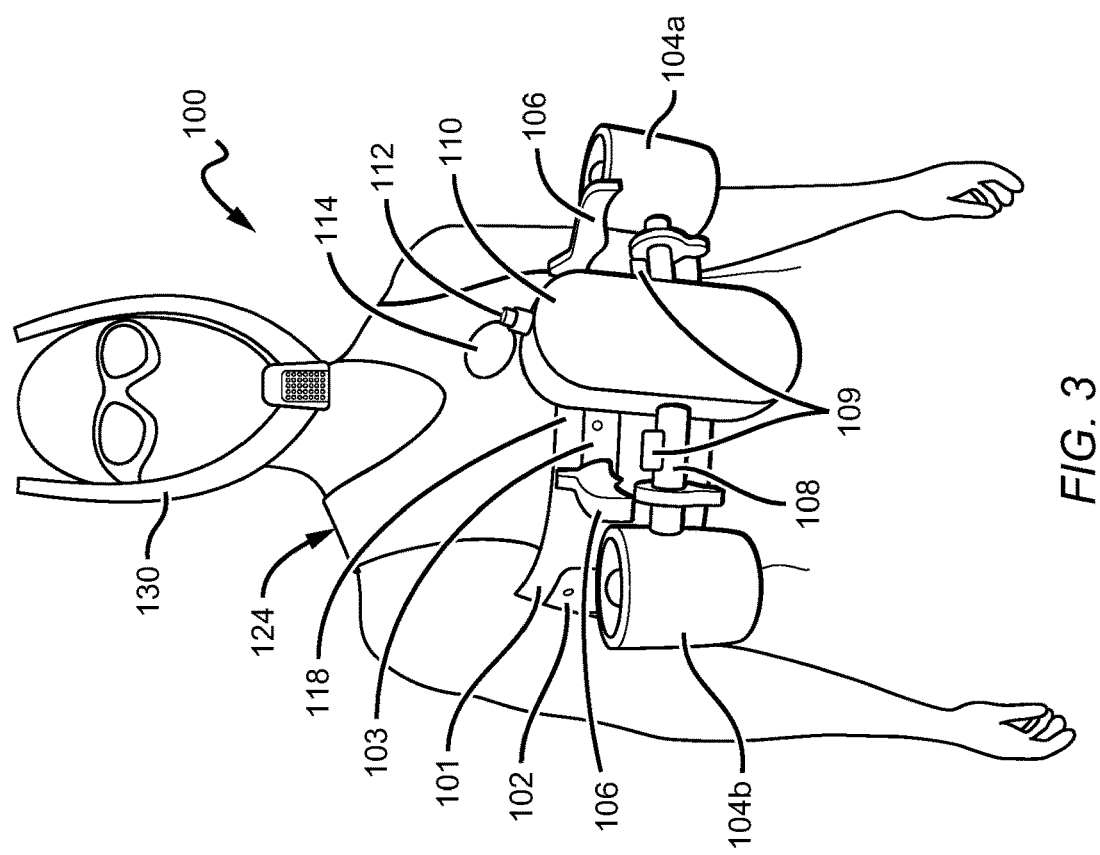

FIG. 3 illustrates a swimmer wearing a first embodiment of a swim system 100 that comprises a swim vest 124 and a repulsion system mounted thereon. The repulsion system includes a central body portion 110, left impeller 104a connected to the central body portion 110 by outrigger 108, right impeller 104b connected to the central body portion 110 by another outrigger 108. The outriggers are fixed to the central portion of the clamshell system by clamps 106. The clamps surround the outriggers 108 and are rigidly attached to a rigid substrate member 103. The rigid substrate member 103 is attached to a padded belt 101 that is preferably formed of a nylon outer layer enclosing a foam core. The padded belt is monolithic and extends from the distal end of the right clamshell element, through the central portion and to the distal end of the left clamshell element. The right clamshell element includes a rigid plastic member 102 that is formed to generally conform to the ribcage of the user. The padded belt 101 serves as a flexible joint between the right clamshell element 102 and the left clamshell element (not visible in FIG. 3). The left clamshell element has a structure similar to the right clamshell element and is correspondingly of a curved shape to generally conform to the left ribcage of the user. The left clamshell element, like the right clamshell element, is hingeably and pivotably attached to the center rigid element 103 by padded belt 101. The padded belt is held in place by hook-and-loop (e.g. Velcro) patches on the inner surface of the padded belt 101 and corresponding patches on the exterior of vest 124.

The central body portion 110 encloses battery components and a control system for the swim system. The battery system may include a waterproof charging port (not shown) and a plurality of battery modules within the central body portion 110. The control system receives control input and applies appropriate voltages and control signals to the impellers 104, as described elsewhere herein.

The central body portion bears a coupling 112 for a manual inflator 114 that is fluidically connected to a bladder element (not shown), positioned behind center rigid portion 103 and in front of the padded belt 101. The bladder may be sandwiched between the portion 103 and padded belt 101. Inflation of the bladder element may provide additional buoyancy and may also tighten the fit of clamshell portions around the user, thereby more securely fixing the swim system in place. This may be useful, for instance, where higher reverse thrust is used. Increased bladder pressure may help prevent the impeller system from torqueing clockwise in the orientation shown in FIG. 2, which would change the vector of the thrust and may cause user discomfort.

The user is equipped with a dual snorkel breathing system 130. The mouthpiece portion includes a two-way valve that provides inhalation of air in the upwardly extending tubes and exhalation through a vented portion on the bottom of the mouthpiece portion. By using such a snorkel system the user may keep his or her head pointed downwardly during a freestyle stroke, obviating the need to turn the head to take a breath.

Figure 4:
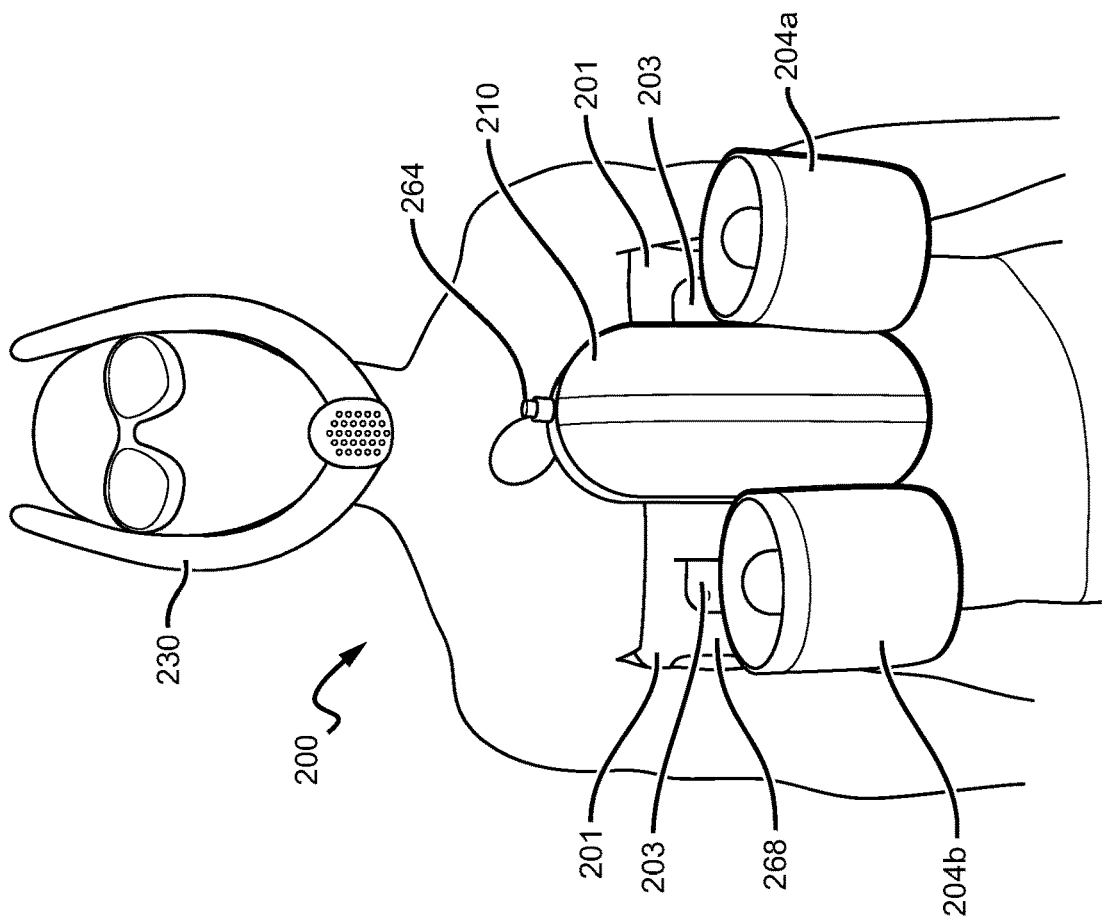
FIGS. 3-4 are illustrations of first and second embodiments of a swim system, respectively, borne by a swimmer.

Turning to FIG. 4, a second embodiment 200 of the swim system is illustrated. This embodiment is constructed similarly to the first embodiment 100, the primary difference being that the impellers 204a and 204b are immediately adjacent the central body portion 210 and are not spaced apart therefrom by outriggers or beam members 108. Further, the user is wearing a band 201 instead of vest 124, both of which may be made of a closed-cell foam neoprene (wetsuit-type) material. The band 201, like vest 124, has on the outward facing surface thereof hook-and-loop fasteners that receive the clamshell portions, as described above.

The clamshell vest system may further include adjustable straps that extend from the top of center portion 103/203, over each shoulder, and down to the clamshell portions 102/202. These straps may be provided to help prevent the swim system from moving downwardly, toward the user's waist, during use or when outside of the pool, when the absence of buoyancy tends to cause the system to fall under the force of gravity.

Figure 5:
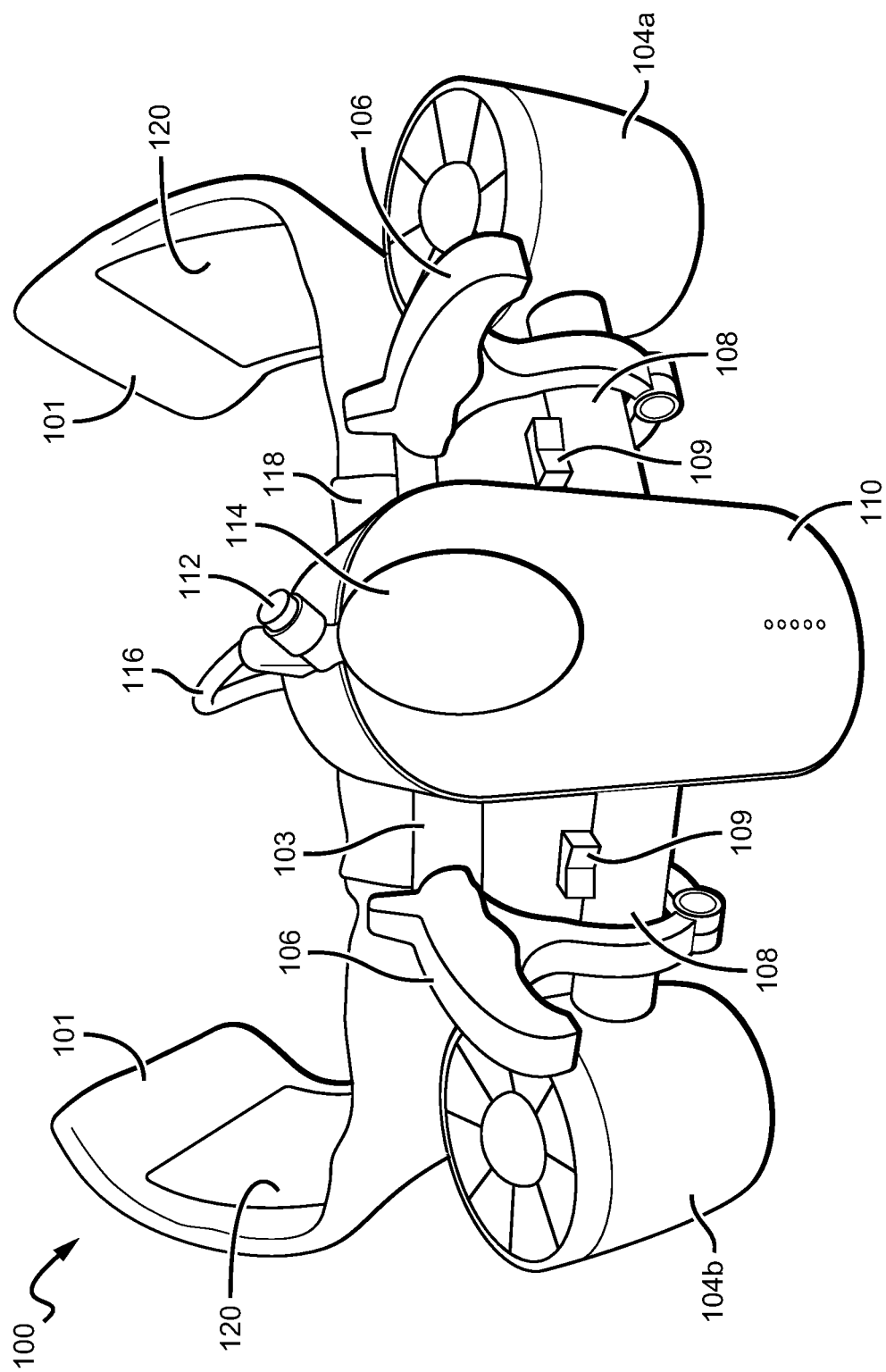
FIGS. 5-6 are further illustrations of the first and second embodiments of a swim system, respectively, not attached to or borne by a swimmer and with its belt system in a closed position.

FIG. 5 provides an additional view of the first embodiment 100. In this view the orientation of clamps 106 may be seen more clearly. Also, the hand pump 114 is oriented outwardly, away from the chest of the user. A pressure release valve 112 is positioned between pump 114 and mounting bracket 116. A tube extends from pump 114, through bracket 116 and to the bladder element positioned between the center rigid portion 103 and padded belt 101.

The impeller housing may be spaced about 1, 2, 3, 4, 5, 6, 7 or 8 inches away from the center rigid portion 103, measured in a direction orthogonal to the center rigid portion. Given that the rigid plate, padded belt 101 and vest/band are collectively about one inch thick, the impeller housing may be spaced about 2, 3, 4, 5, 6, 7, 8 or 9 inches from the user's abdomen.

In the first embodiment 100, the impeller housing are spaced about 4 inches from the rigid plate 103, and about 5 inches from the user's abdomen or frontal rib cage. By contrast, in the second embodiment 200 of FIG. 6, the impeller housing are spaced about 5 inches from the rigid plate 203, and about 6 inches from the user's abdomen or frontal rib cage.

Returning to the first embodiment 100, the central axis of each impeller 104 is positioned about 12, 13, 14, 15, 16, 17, 18, 19 or 20 inches from one another, most preferably about 16. In the second embodiment 200, the central axis of each impeller 204 is positioned about 6, 7, 8, 9, 10, 11, 12, 13 or 14 inches from one another, most preferably about 9 inches. The impellers themselves (not shown) have an outer diameter of about 2, 3, 4, 5, 6, 7 or 8 inches, most preferably about 4 inches.

As noted above, this spacing may facilitate provision of laminar flow to and through the impellers 104, 204. If the impellers are positioned immediately adjacent the rigid plate 103, 203 or padded belt 101, in certain configurations the boundary layer effect may impede the laminar flow of water into the bottom of the impellers and out the top of the impellers. For a given power usage, the amount of reverse thrust may be reduced and turbulent flow will be created proximate the legs, face and arms of the user while swimming. As discussed above, such turbulent flow reduces stroke and kick effectiveness and can impede breathing, especially when the user is not using a snorkel apparatus 130.

The spacing will also affect the amount of torque applied by the impellers on rigid plate 103, 203. When the impellers thrust forward (upward in FIGS. 3-4), that tends to push the central body portion using 210 downward or towards the feet of the swimmer, creating a clockwise torque in the orientation shown in FIG. 2. That torque may cause substantial discomfort, which is alleviated by the padded belt 101 together with the force-spreading effect of rigid plate 103, 203 and the bladder element. In currently preferred embodiments, the impeller housings are spaced, about 3, 4, 5 or 6 inches from the abdomen of the user or about 2, 3, 4 or 5 inches in front of the rigid plate 103, 203.

In various embodiments, the rigid center portion 103, 203 and rigid clam shell portions 102, 202 are made of fiberglass, polyurethane, Kevlar, or aluminum in preferred embodiments. Such constructions provide the necessary structural rigidity and corrosion resistance at a low weight. Embodiments using polyurethane commonly used in commercial shin guards and shoulder pads are particularly preferred, as this material provides a degree of flexibility that permits the clamshell portion to bend slightly to conform to larger ribcages while not unduly impeding ribcage expansion during respiration.

FIG. 7 is a further illustration of the first embodiment of the swim system. In this figure additional detail of the foam-core padded belt 101 can be seen. The rigid clamshell portion 102 is fastened to at least one layer of the padded belt 101. On each outrigger is an optional button 109 that controls the impellers 104a, 104b. One button may turn the impellers on and the other may be used to control the motor speed. In other embodiments, and as described below, the system may turn on automatically when an accelerometer in central body portion 110 detects that the system is positioned substantially horizontally and off when the system is positioned substantially vertically.

FIGS. 18-19 depict a variant in which accelerometers or a position detection switch 186 such as mercury switch inside the central body portion 110/210/310 detect whether the repulsion system is in a vertical or horizontal position. The user may select an orientation, for example about 10, 15, 20, 25, 30, 35, 40, 45, 50, 55, 60, 65, 70, 75, 80 or 90 degrees from vertical (90 degrees from vertical being completely horizontal), at which the repulsion system will activate. The user's selection may be set by a knob positioned adjacent buttons 109 or via the smart watch application. When the user begins to swim and assumes a substantially horizontal position the repulsion system will activate at the thrust force and direction (vector) selected by the user or the training/R application controlling the swim system. In one example, upon reaching the end of the pool or another distance objective, the swimmer performs a non-flipping turn in which the upper torso assumes a generally upright or vertical position (less than 45 degrees from vertical). When in that position the reverse thrust is deactivated until the swim system detects that it has returned to a horizontal or swimming position. After pushing off the wall, the swimmer regains this orientation and the reverse propulsion system reactivates.

This auto-on and auto-off functionality can provide substantially improved safety as well. By setting the switching point to an angle of about 65 degrees from vertical, for example, an inexperienced to physically compromised swimmer may stop the repulsion system simply by pitching themselves upwards in the water by assuming a dog paddle position. Assuming a position having a pitch of about 25 degrees or less is a natural reaction when a swimmer ingests water or otherwise feels unable to breathe or out of control or is starting to panic. In this manner, the repulsion system may be prevented from creating a thrust of water toward the head region of the swimmer when the swimmer is in an emergency or panic situation.

Figure 6:
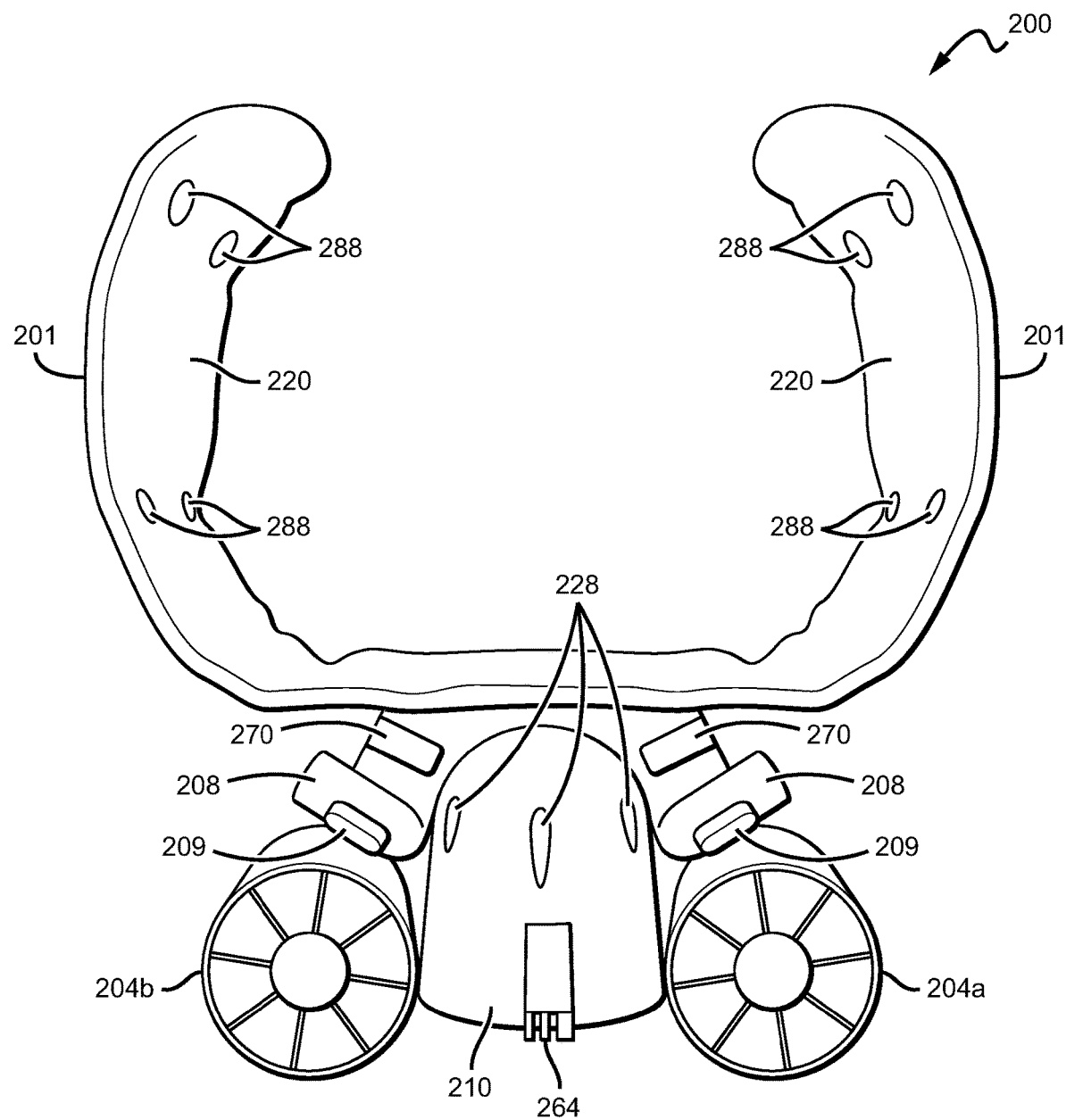

FIGS. 6 and 8 are further illustrations of the second embodiment of the swim system. In the depicted variant, beams 108/208 are present but may be removed in other embodiments, permitting the impeller central body portions 204 to be positioned closer to rigid plate 203. In this variant the repulsion system is mounted to rigid plate 203 at bracket or strap 270.

In FIG. 9, air bladder 118 may be seen positioned between padded belt 101 and rigid plate 103. It should be noted that rigid plate 103 may have a curved shape that generally conforms to a user's ribcage or upper front abdominal area. Hand pump 114 is shown extending outwardly, away from the user. In this variant, the pump 114 is preferred returned to a stowed position (toward the user) after inflation (or deflation) is complete. Velcro pads 120 are positioned on the interior of each clamshell portion and the interior of the center portion 103.

Hereinafter, the rigid clamshell portions 102/202, rigid center plate 103/203, and foam-core or padded belt 101 will be collectively referred to as the "clamshell belt system." The "repulsion system" includes the central body portion 110/210 and the impeller units 104/204. The system thus has in the illustrated embodiments two primary sub-parts: the clamshell belt system and the repulsion system.

The repulsion system may have a weight of about 2, 3, 4, 5, 6, 7, 8, 9, 10, 11, 12, 13, 14 or 15 pounds, most preferably about 6 pounds. The overall width of the repulsion system (in a direction parallel to the waist or beltline when worn) may be about 12, 13, 14, 15, 16, 17, 18, 19, 20, 21, 22, 23 or 24 inches, most preferably about 16-19 inches. The overall height of the repulsion system (in a direction parallel to the centerline of the swimmer) may be about 7, 8, 9, 10, 11, 12, 13, 14, or 15 inches, most preferably about 8-10 inches. The overall depth of the repulsion system (in a direction perpendicular to the centerline of the swimmer) may be 2, 3, 4, 5, 6, 7, 8, 9, 10, 11 or 15 inches, most preferably about 4-8 inches.

The battery capacity of the repulsion system may be about 50, 60, 70, 80, 90, 100, 125, 150, 175, 200, 225, 250, 275, 300, 325 or 350 Watt hours, preferably at least about 100 Wh. This provides repulsion for about 10, 20, 30, 40, 50, 60, 70, 80, 90, or 100 minutes at full power, preferably at least about 30 minutes. The battery may preferably be a rechargeable lithium ion battery that is charged through a USB style charging port on central body portion 110/210. The thrust of the repulsion system may be about 5, 10, 15, 20, 25, 30 or 35 pounds at full power, most preferably about 20-25 pounds.

FIGS. 7-8 are illustrations of the first and second embodiments of the swim system in a fully open configuration, as would be the case if the swim system was laying flat on a horizontal surface. The clamshell belt system can open in this fashion because the textile member 101/201 provides a flexible hinge-like connection between the clamshell portions 102/202, rigid center plate 103/203.

Figure 15:
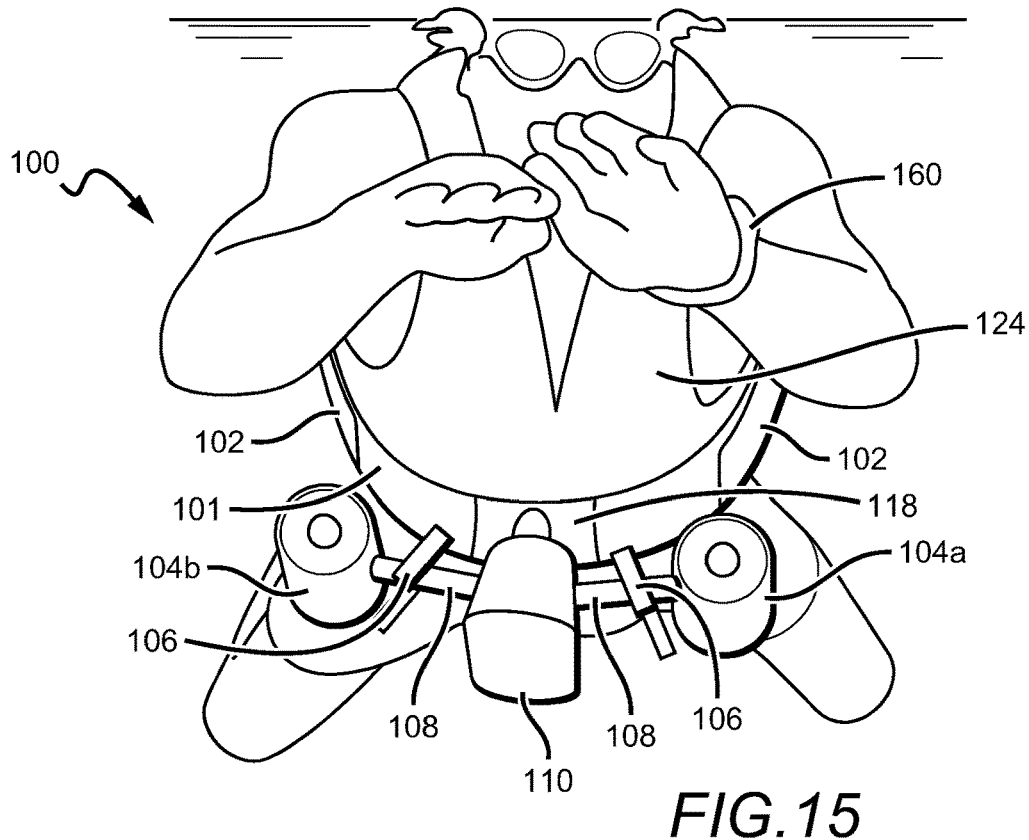
FIGS. 15-17 are illustrations of the first embodiment of the swim system in use.
Figure 16:
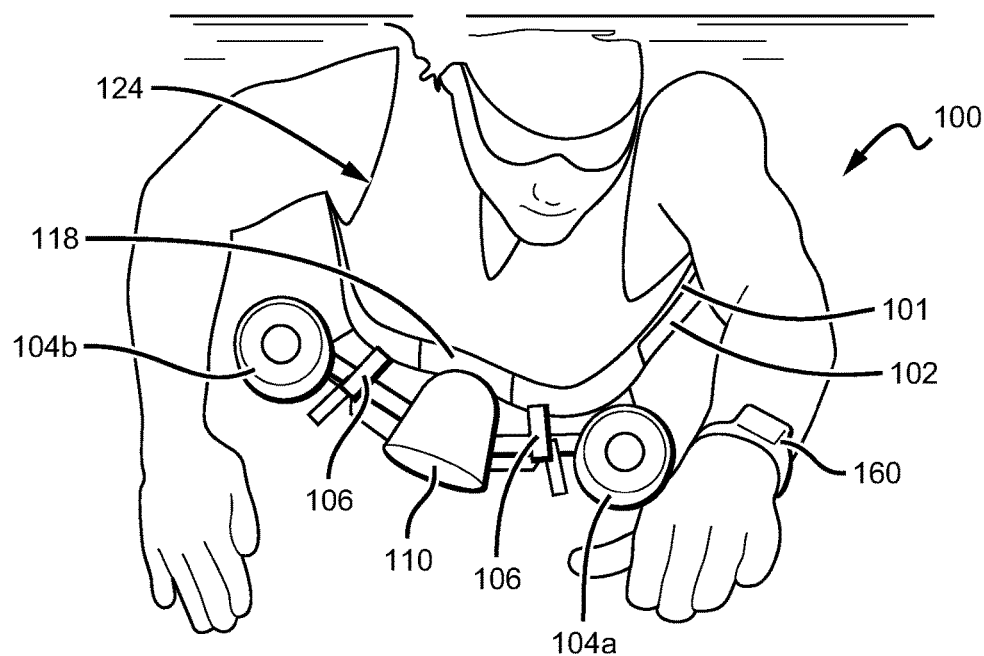
Figure 17:
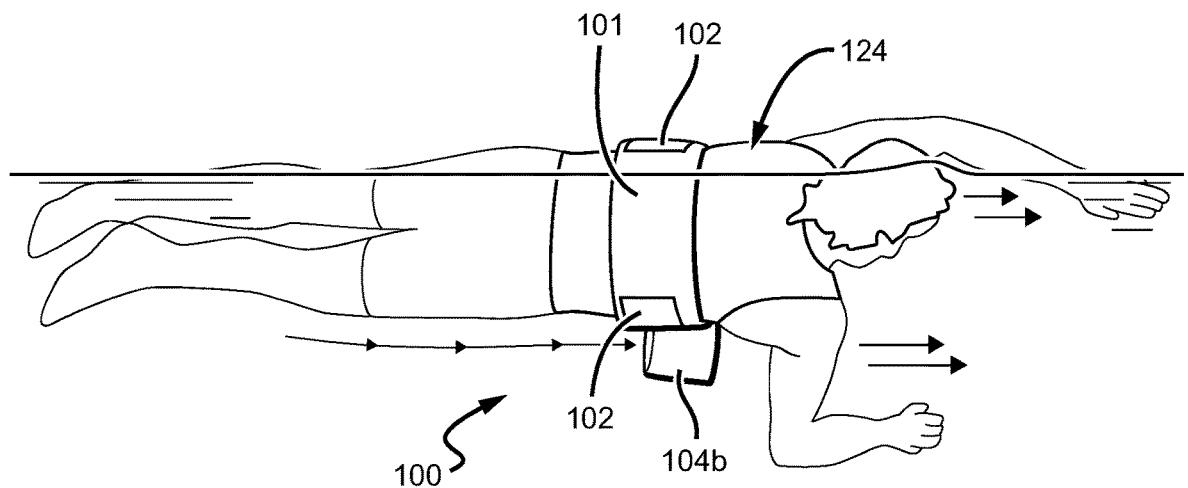
Figure 20:
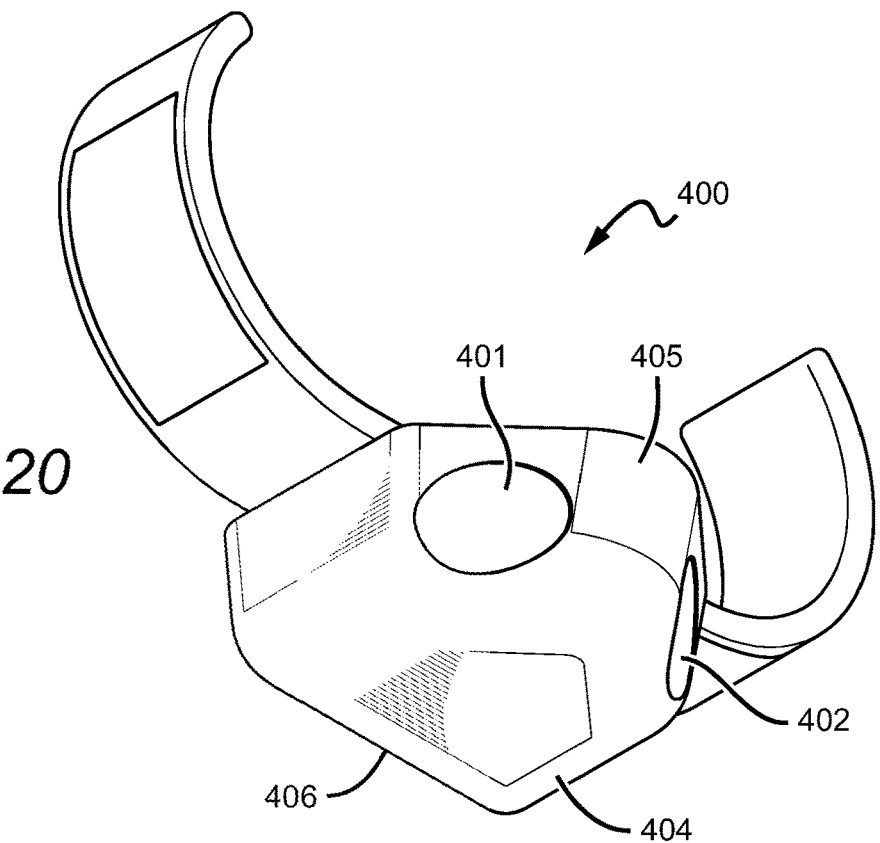
FIGS. 20-26 are illustrations of additional embodiments of the swim system.
Figure 21:
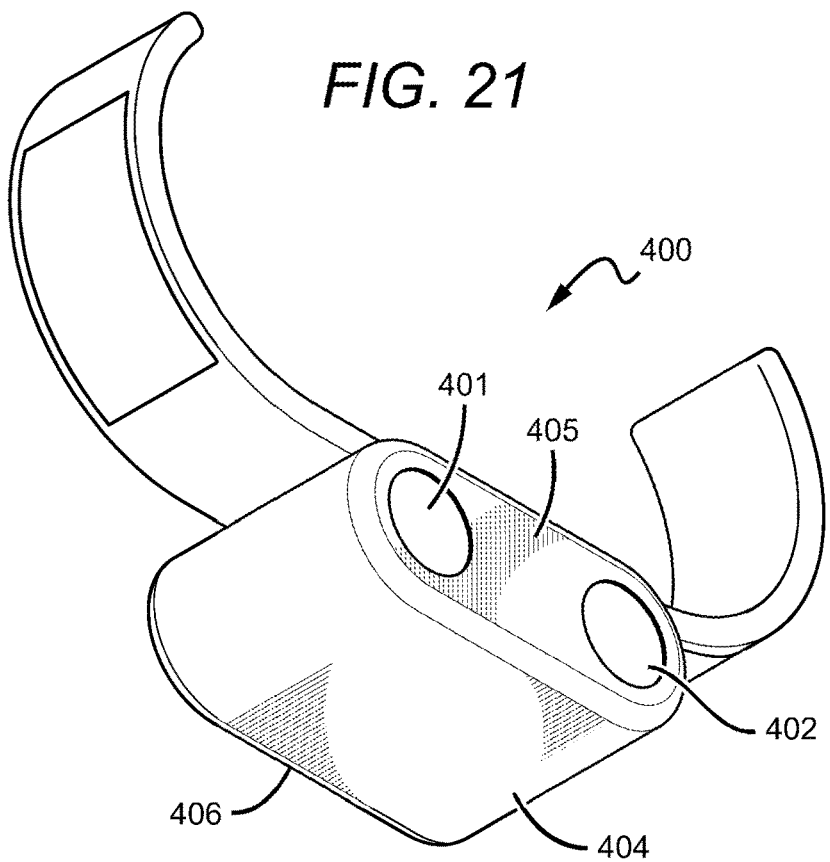
Figure 22:
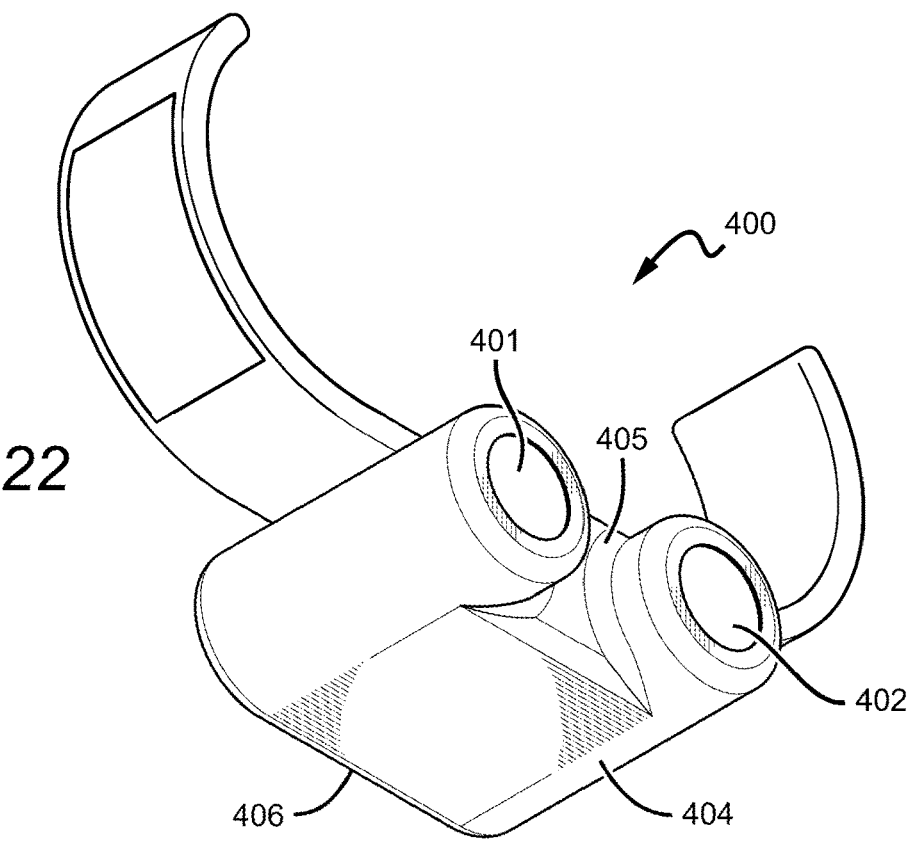
Figure 23:
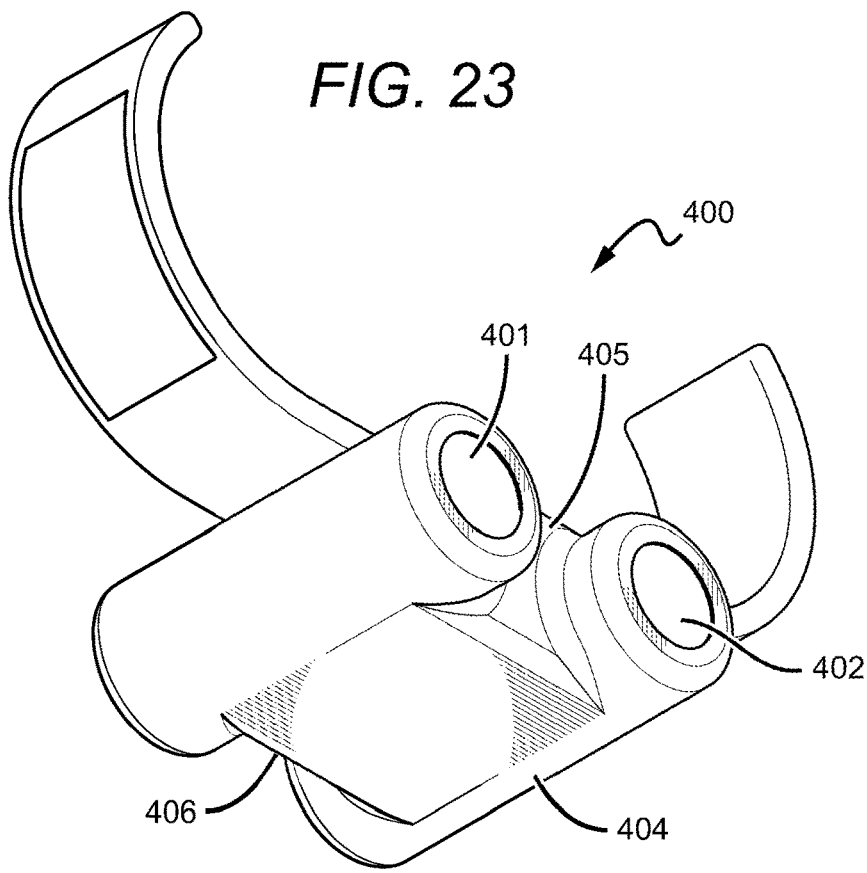
Figure 24:
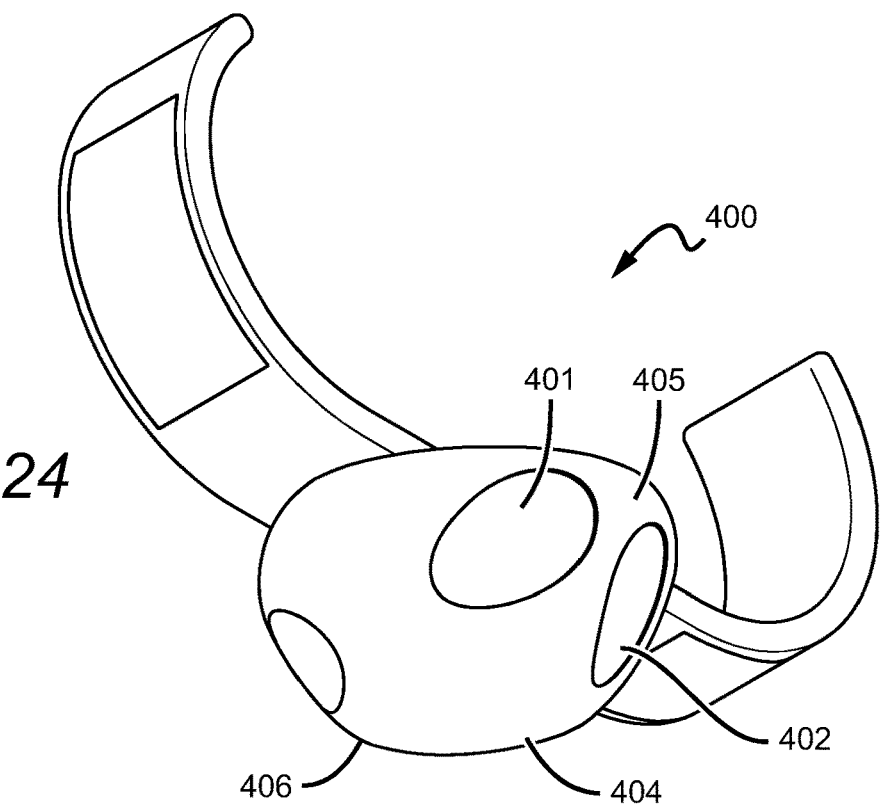
Figure 25:
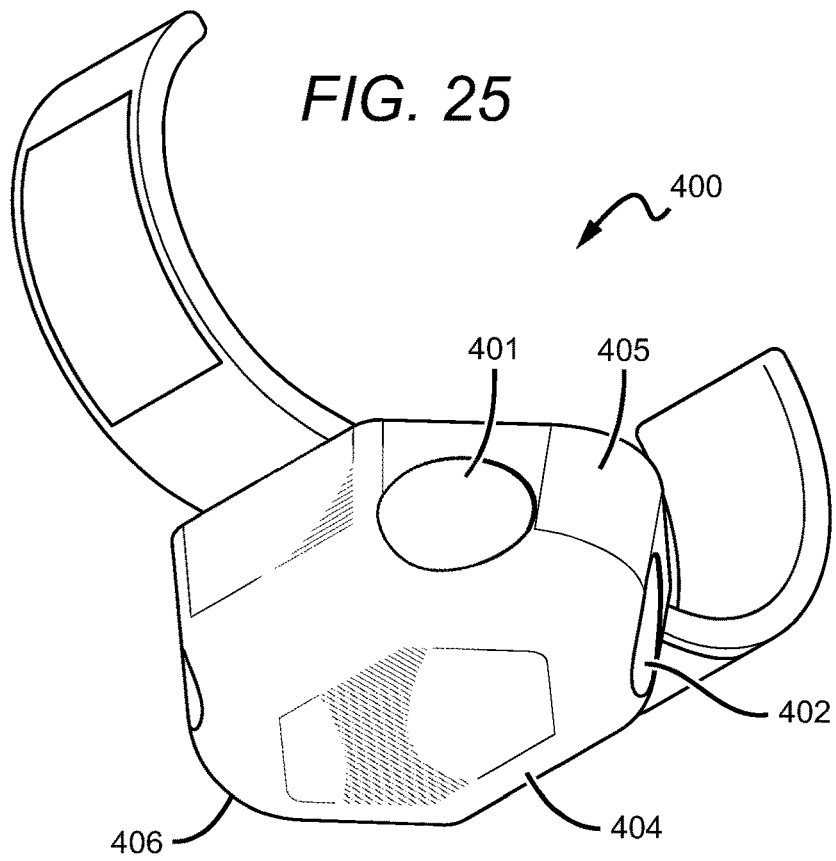
Figure 26:
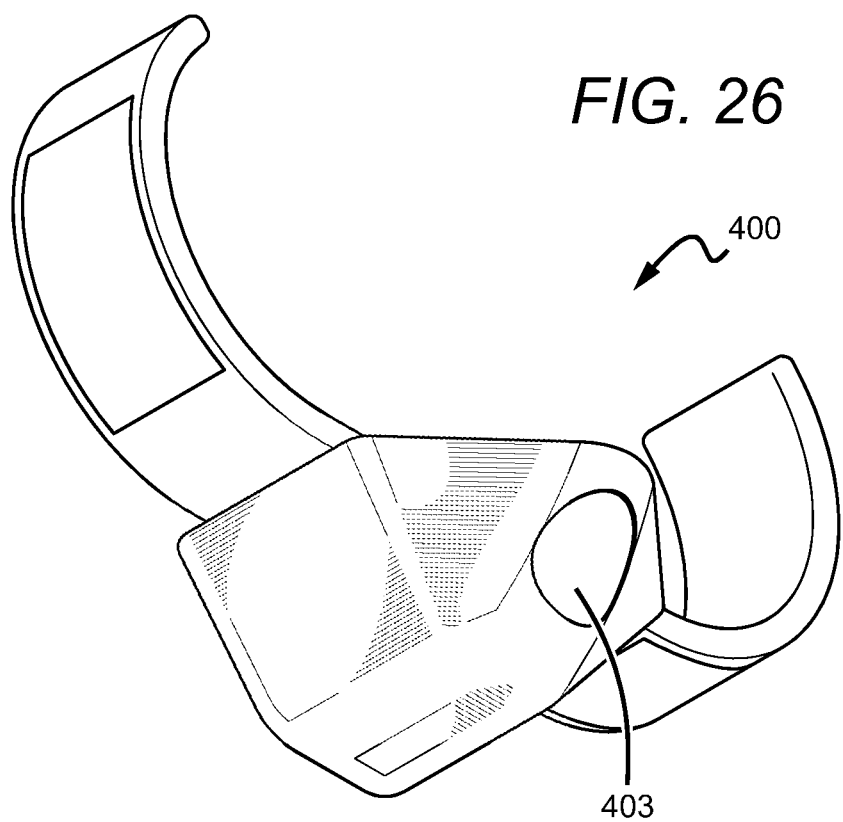

FIGS. 15-17 are illustrations of the first embodiment of the swim system in use. These figures depict a user performing a freestyle stroke with the exception of FIG. 15, which illustrates a breaststroke. When a swimmer assumes a horizontal position in the water, the accelerometer triggers the repulsion system to activate. The speed of the system is controllable by the user actuating one of the buttons 109 or their smart watch, as described in the following sections. With reference to FIG. 17, the water is drawn by the impellers from the left, under the user's legs, through the impeller central body portions and pushed to the right past the left and right sides of the user's face, as shown by the parallel arrows proximate the arms of the swimmer.

During a freestyle swimming stroke, for instance, this provides substantially laminar current under both the user's legs and in the areas adjacent and in front of the user's head where the freestyle arm stroke enters the water. This substantially laminar current makes the user's strokes and kicks more effective relative to swim-in-place systems. The user does not need to "outkick" his or her stroke in order to keep the feet properly elevated. In conventional swim-in-place systems, the user generally needs to kick much faster than the arm stroke would normally require or call for. The user must therefore kick faster than is appropriate for his or her arm stroke in order to keep the feet elevated. The swim systems described may be configured to overcome that problem in various embodiments.

The laminar flow in the region around the user's head increases the effectiveness of the stroke because the water is not turbulent. Strokes in turbulent water generate less force than those in laminar currents or stationary water. Turbulence in the region around the user's head can also distort the user's vision and make it more difficult to breathe. As discussed above, conventional swim-in-place systems can cause substantial turbulence in this region which increases the likelihood that a user inhales water when taking a breath.

The system described herein may be used for freestyle, breast and fly strokes. The breaststroke is illustrated in FIG. 15. A fly stroke will bring the user's shoulders out of the water, but the impellers remain sufficiently deep in the water to provide relatively constant reverse thrust of the selected power.

Returning to FIGS. 16-17, the system provides laminar flow under the user's legs and shoulders. Provision of two impellers generally aligned with each of the user's shoulders optimally promotes laminar flow under each leg, which substantially avoids the leg drop problem associated with conventional swim-in-place systems. As shown, the natural twist of the upper torso while swimming promotes this function by pulling one impeller system down and toward the centerline of the swimmer and under the legs of the swimmer during at least a portion of a freestyle stroke. This provides increased current flow under the legs. At the same time the other impeller system is pushed further away from the centerline of the swimmer, thereby increasing the laminar current flow in the area of the arm strokes, which improves the effectiveness of each stroke. In this fashion the reverse propulsion system can provide optimally increased current under both the legs of the swimmer and both arm stroke regions without directing any uncomfortable current at the mouth and nose of the swimmer.

In one currently preferred method of use, the swimmer first selects an amount of reverse thrust that permits the swimmer to make slow forward progress against the reverse thrust. Upon starting to swim, the user's torso and thus the swim system will assume a generally horizontal position. Upon detection of that substantially horizontal orientation, the impeller systems begin to spin and provide the selected amount of reverse thrust. In one example, the swimmer requires forty strokes to traverse a seven meter residential swimming pool, thereby effectively extending the residential swimming pool to serve the same purposes as a twenty-five meter or longer lapping pool. Upon reaching the end of the lane, the swimmer performs a non-flipping turn in which the upper torso assumes a generally upright or vertical position. When in that position the reverse thrust is deactivated until the swim system detects that it has returned to a horizontal or swimming position. After pushing off the wall, the swimmer regains this orientation and the reverse propulsion system reactivates.

FIGS. 10-11 are illustrations of a vest for use with the first or second embodiment of the swim system. In the vest 124 has Velcro portion 122 on its exterior that receives or attaches to the complementary Velcro patches 120 on the clamshell belt system. The vest 124 may also have additional Velcro portions or pockets 171 to receive foam or other buoyancy providing elements 173 (anything with a density less than water). In the case portions 171 are Velcro, the buoyancy providing elements 173 are provided with complementary Velcro layers on their inwardly facing sides. The elements 173 may alternatively have a circular, oval or rectangular shape. Optionally a single element 173 may have a width sufficient extend across the area of both portions 171. Elements 173 are preferably about 0.5, 1, 1.5 or 2 inches thick. In a further alternative embodiment, elements 173 are one or more air bladders coupled to one or more hand pump systems 112/114/116 attached to the vest 124. In another embodiment, the vest 124 can be part of a wetsuit that can include additional Velcro portions or pockets 171 on the leg portions of the wetsuit to receiving buoyancy providing elements 173 to increase the buoyancy effects.

Figure 12:
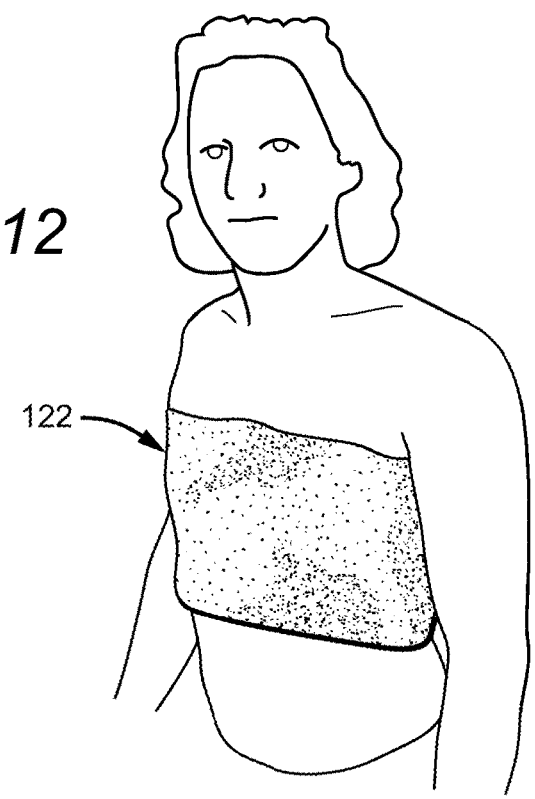
FIG. 12 is an illustration of a band-type garment for use in combination with the system.

In FIG. 12 a wrap or belt 122 has Velcro on its exterior that receives the complementary Velcro patches 120 on the clamshell belt system. The wrap or belt may be desirable in higher water temperatures and may provide increased comfort for certain users, whereas the vest may be preferred in lower temperatures and may provide increased comfort for other users.

Figure 13:
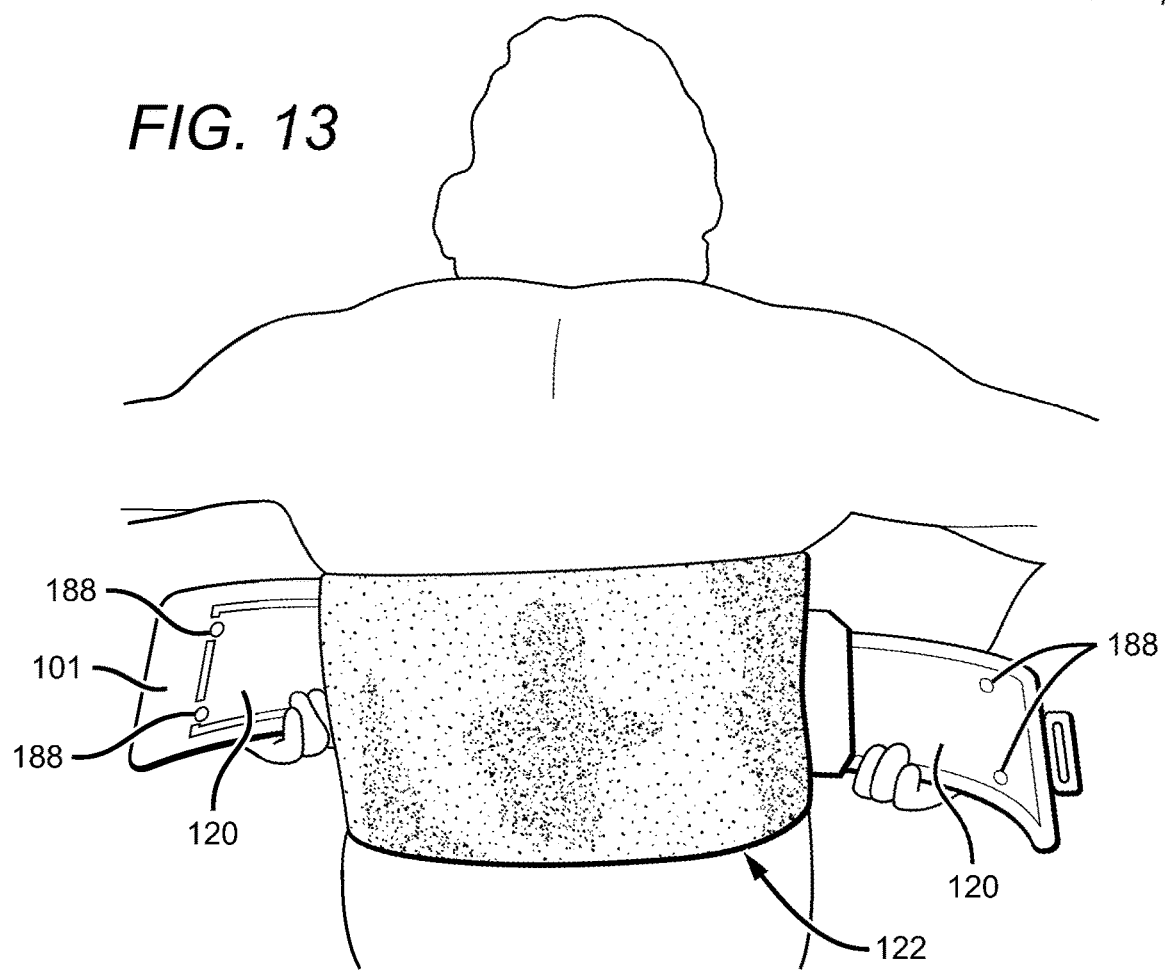
FIGS. 13-14 are illustrations of a method for mounting the system to the band-type garment.
Figure 14:
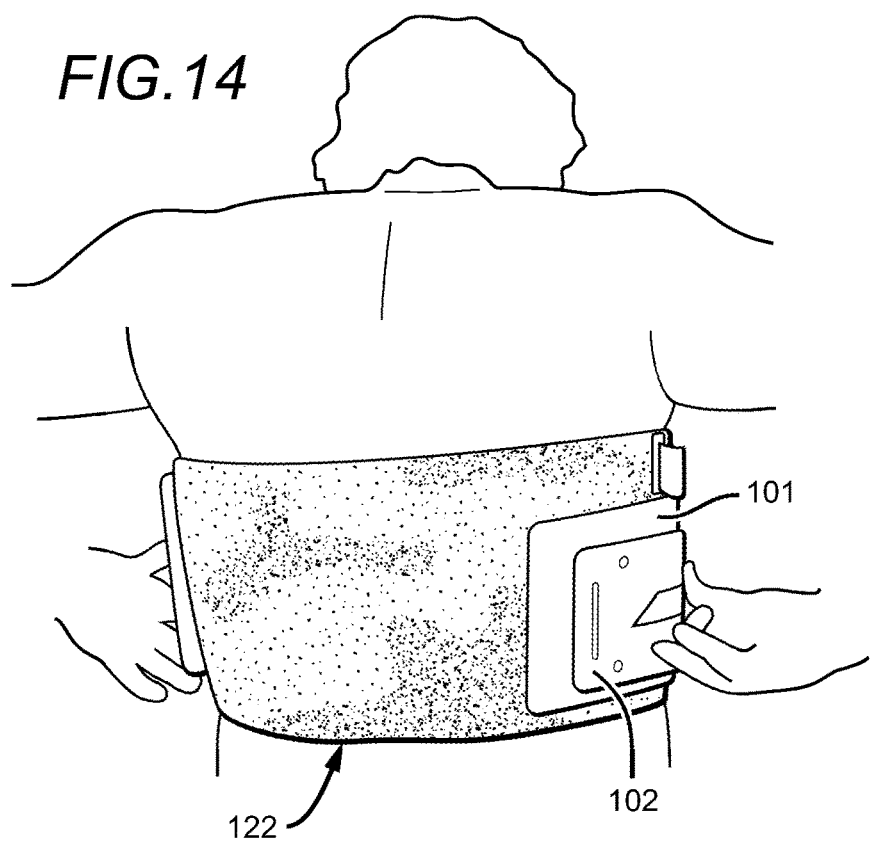

FIGS. 13-14 illustrate a method of donning a swim system equipped with a clamshell belt system. The user holds the clamshell belt system and presses the center portion 103/203 against the sternum area and the clamshell portions against the sides of their ribcage. The Velcro portions 120 hold the swim system firmly in place until the user removes the clamshell belt system by first pulling the ends of the belt system away from the sides of their rib cage and then pushing the belt system away from their sternum to detach the Velcro patch 120 at the center portion. In another embodiment, instead of the Velcro portions 120, the swim system may be held in place by a ratcheting buckle/strap assembly that can be adjustably secured around a ribcage of the user.

The swim system may alternatively be mounted to the legs of the user. In such an embodiment, the impellers are mounted to the lateral sides of the users legs. In one version of such an embodiment, two swim systems may be provided that are essentially each miniaturized versions of the swim system of FIG. 5. Instead of attaching to a vest or band, the clamshell attaches to Velcro on the thigh portion of neoprene shorts. The Velcro portion surrounds each thigh just as the Velcro portion 122 surrounds the torso. In another version, one or more impellers is mounted to a flexible neoprene band sized to fit snugly around a swimmer's thigh. The users pull the band up over the knee an onto the thigh such that the impeller is positioned laterally outwardly of the thigh. Two such systems are donned by the swimmer, one on each leg, such that the impellers are positioned laterally outside of each thigh, in the same positions conventional gun holsters would occupy. The two units each have a controller and communicate wirelessly. The user's control inputs are preferably provided only to a single master unit, which wirelessly communicates to the other unit. In a still further version involving neoprene shorts having impellers fixedly mounted thereto, a wired connection between the two impeller units is optionally used.

FIG. 15 illustrates a variant of the first embodiment of the swim system that includes a smart watch 160. The smart watch communicates via Wi-Fi, cellular or Bluetooth with a processor and communication system inside central body portion 110. An application on the smart watch is configured to receive from communication system real-time data concerning the reverse thrust, including values corresponding to or correlated with impeller speed and thrust axis. The application also measures stroke and lap count, as is now conventional, by using accelerometers and inertial motion sensors within the smart watch. The application may thus report to the user performance metrics such as lap equivalents and calorie burn. A lap equivalent may be, for instance, a number of strokes which would be sufficient to traverse a 25 meter pool given the amount of horizontal reverse thrust exerted by the swim system over time. The laps may additionally be counted or verified by detecting the number of times the system regains a substantial vertical orientation during each turn maneuver, as described above.

The application may report to the user at the end of a swimming session the number of 25 meter laps the user would have completed if the user had been swimming in such a pool within the swim system. The application may also factor vertical thrust into its calculation of lap equivalents. For instance, greater upwards thrust generally makes swimming easier, and thus upwards thrust data may be used to adjust the lap equivalent count downwardly.

Shown in FIG. 9 is an optional air bladder 118 that may be positioned between center portion 103 and padded belt 101. Additionally or alternatively, bladder portion(s) may be provided in the space between center portion 103 and outriggers 108 and also in the space between impeller nacelles 104 and the central body unit 110. The central body unit 110 may also be made larger to accommodate a buoyance chamber therein that contains the bladder unit and effectively encloses the entirety of the impellers and other components.

Such embodiments are depicted in FIGS. 20-26. The housings 404 of these swim systems 400 may be fluidically open to the surrounding water environment by providing one or more apertures such as vents in the housings (not shown). As the air bladder is inflated, the bladder expands to displace water out of the housings 404 and provide lift. Each swim system 400 is provided with one or two impellers, each of which is provided within parallel annular tunnels 401/402/403 which extend through the housings 404. As in the first and second embodiments discussed above, water is drawn toward the bottom end 406 of the swim system and into the bottom end of the impeller tunnels (not shown) and thrust upwardly (or forwardly) out the top end 405 of the swim system 400.

In certain embodiments, safety may be enhanced by providing the air bladder with a fixed volume of air that provides full expansion and thus full buoyancy unless and until the air bladder is compressed. This may be accomplished by providing a second bladder chamber adjacent the air-filled bladder chamber such that expansion of the water filled bladder chamber compresses the air-filled bladder chamber, thereby reducing the volume of the air-filled chamber and thus reducing buoyancy. The water filled chamber may be filled or emptied with a hand pump similar to pump 114 or, alternatively, by water pressure provided by the flow of water through the impeller nacelles or tunnels. In the latter embodiment, a scoop-shaped element may protrude slightly into the interior of the nacelle to divert water into a conduit that feeds the water filled bladder. Water may be released from the water filled bladder by opening a valve, which permits the water to exit the bladder under the expanding force of the pre-filled air bladder. In this manner the buoyancy may be adjusted automatically without the need to actuate a hand pump. In still other embodiments, an air pump may be provided within center body unit 110 or housings 404 to expand the air bladder(s) as desired.

Figure 27:
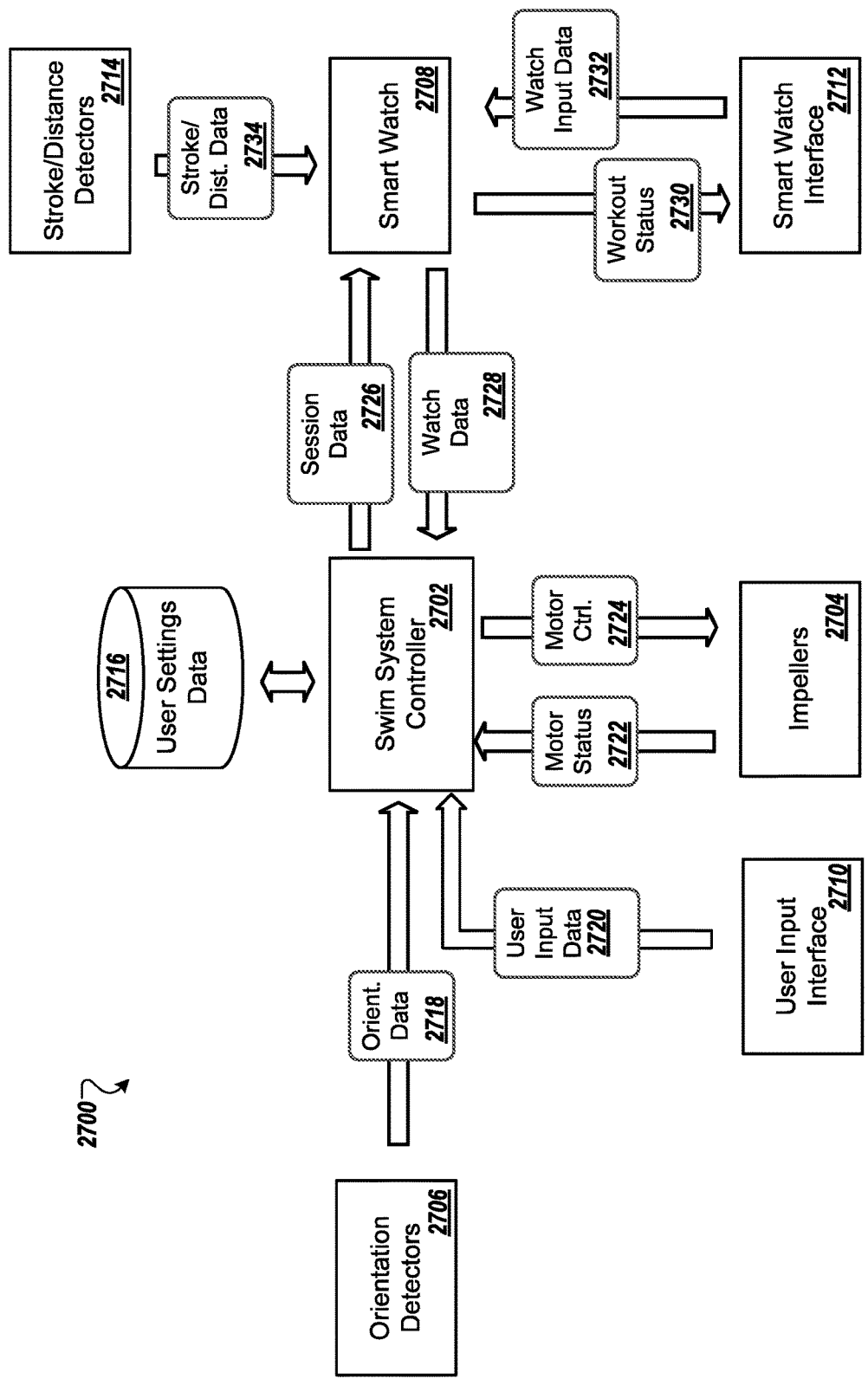
FIG. 27 is an illustration of a system flow diagram for controlling a swim system.

FIG. 27 illustrates a system flow diagram of a swim system control system 2700 for the swim system described herein. In some implementations, the swim system includes a controller 2702 that may be positioned within a housing (e.g., central body portion 110) mounted to a rigid portion of swim system 100, such as rigid plate 103 or outrigger 108. In one example, the controller 2702 is integral with and/or adjacent to user input buttons 109. The controller 2702 can include one or more processors with circuitry configured to control operation of the swim system based on received sensor inputs, user inputs, and/or predetermined configuration settings. In some embodiments, the controller 2702 is communicatively coupled to one or more orientation detectors 2706, impellers 2704 (e.g., impellers 104), swim system user input interface 2710 (e.g., buttons 109), and/or smart watch 2708 (e.g., smart watch 160). Each of the connected components may be connected to the controller 2702 via a wired or wireless communication link. For example, the smart watch 2708 may be connected to the controller 2702 via a wireless communication link (e.g., Wi-Fi, cellular, or Bluetooth link) while user input interface 2710, user input interface 2710, and/or impellers 2704 may be connected to the controller 2702 via a wired connection. In some examples, controller 2702 may also connect to circuitry of a snorkel mask configured to display virtual reality (VR), augmented reality (AR), or mixed reality (MR) imagery and/or data on one or more display surfaces of the mask (e.g., snorkel mask assemblies 2800, 2900 in FIGS. 28A-28B and FIG. 29). In some examples, the controller 2702 can be figured to transmit sensor data (e.g., orientation data 2718) and/or motor status data 2722 to a connected snorkel mask assembly 2800, 2900 for generating VR, AR, and/or MR imagery for display. In other examples, the controller 2702 generates the VR, AR, and/or MR imagery that is transmitted to the mask for display.

Additionally, in some examples, central body portion 110/210/310 contains sonar sensors, the transducers of which may be positioned in apertures on the exterior of the central body portion. In other embodiments, the central body portion may include sonar emitters as well to aid the identification of the swimmer's surroundings to aid, for instance, in interactive training experiences. The central body portion further includes 3D accelerometers and inertia sensor modules, as are conventionally deployed in VR/AR/MR handsets and smart phones, which indicate the orientation and direction of movement of the swim system. These sonar sensors and emitters, accelerometers, inertia sensor modules can be used by the controller 2702 and/or controller 2822, 2922 on a snorkel mask assembly to generate VR/AR/MR imagery for display on a snorkel mask display.

In some implementations, orientation detectors 2706 may provide orientation data 2718 to the controller 2702 indicating a swimmer's position in the water. The orientation detectors 2706 can be accelerometers or a position detection switch 186 such as mercury switch inside the central body portion 110/210/310 that detect whether the repulsion system is in a vertical or horizontal position. When the user begins to swim and assumes a substantially horizontal position, as indicated by orientation data 2718, the controller 2702, in some implementations, activates at the thrust force and direction (vector) selected by the user or the training/YR application controlling the swim system. In one example, upon reaching the end of the pool or another distance objective, the swimmer performs a non-flipping turn in which the upper torso assumes a generally upright or vertical position (less than 45 degrees from vertical). In some examples, the orientation detectors 2706 detect the change in orientation angle, and the controller 2702 deactivates the reverse thrust until the received orientation data 2718 indicates that the swimmer has returned to a horizontal or swimming position. After pushing off the wall, the swimmer regains this orientation and the reverse propulsion system reactivates.

In some embodiments, the controller 2702 can be configured to communicate with and control impellers 2704 via motor control signals 2724. Each of the impellers 2704 of the swim system can be individually controlled by the controller 2702. In some examples, the controller 2702 receives motor status data 2722 from each of the impellers 2704 indicating speed, direction, and thrust of the respective impeller 2704 as well as whether any error status alerts are present (e.g., motor high temperature alarms, low battery/charge levels). Based on the received motor status data 2722, the controller 2702 can cause adjustment of one or more operational parameters of the impellers 2704 via motor control signals 2724 to achieve a desired thrust for the swim system as indicated by user inputs. In one example, upon receiving a user input indicating a desired time between laps, the controller 2702 may automatically adjust operational parameters of the impellers 2704 as the swimmer increases or decreases swimming speed so that the desired time between laps is achieved.

In some implementations, the swim system can include a mounted user input interface 2710 that allows the user to provide user input data 2720 to the controller 2702 for controlling impellers 2704 during a swim session. The user input interface 2710 can include a touch screen, buttons 109 and/or a knob that allows the user to input a desired speed and/or resistance through the water, thrust, time between laps, or orientation for deactivating impellers 2704. In one example, the user may select, via user input interface 2710, an orientation, for example about 10, 15, 20, 25, 30, 35, 40, 45, 50, 55, 60, 65, 70, 75, 80 or 90 degrees from vertical (90 degrees from vertical being completely horizontal), at which the repulsion system will activate. The user's selection may be set by the touchscreen, buttons, knobs or via the smart watch application. In addition, the user can also use screen, knob and/or buttons 109 to input thrust force and direction (vector) selected by the user or training application controlling the swim system. In some examples, the user can select a preprogrammed setting for the reverse thrust system via user input interface 2710. For example, the controller 2702 can access stored user settings data 2716 that can be programmed by individual users for desired thrusts, workout time, and/or preferred orientation angle for triggering shut-off.

In some implementations, the controller 2702 communicates workout session data 2726 to an application on smart watch 2708 that is configured to convey workout session status information 2730 to a user via smart watch interface 2712. In some embodiments, the smart watch 2708 can communicate watch data 2728 to the controller, which can include watch input data 2732 received at smart watch interface 2712 as well as stroke and distance data 2734 received from stroke/distance detectors 2714. In some examples, the smart watch interface 2712 can include a display screen that displays the workout status 2730 and/or coaching information to the user. In addition, the smart watch interface 2712 can include haptic or audio output interfaces for conveying time, number of laps, speed, and/or workout cues to the user during the swim session via waterproof earphones. The smart watch interface 2712 can also include a user input interface, such as through a touchscreen interface, for providing watch input data 2732. In some examples, the watch input data 2732 can include redundant controls for the user input interface 2710. In addition, the watch input data 2732 can include additional workout session parameters than what is provided at the user input interface 2710. For example, the user can input swim stroke information (e.g., freestyle, breast stroke, butterfly) at the smart watch 2708 that can be used by the controller 2702 to customize impeller control based on the selected stroke.

In some embodiments, the smart watch 2708 can receive stroke/distance data 2734 from one or more stroke/distance detectors 2714 to enable enhanced interactive training and data-driven analysis of swim strokes and performance. In some implementations, the stroke/distance detectors 2714 can include the inertial sensors, accelerometers or other motion sensors of the watch. The controller 2702, in some examples, may cooperate with smart watch 2708 to provide interactive training experiences and track performance by factoring in the reverse thrust provided by the swim system over time. An application on the smart watch 2708 may advantageously receive from the controller 2726 real-time session data 2726 concerning reverse thrust and swimmer orientation in the water.

The application on the smart watch 2708 may provide interactive training, coaching and related input and feedback to user the through waterproof earphones. The controller 2702 or on-board the smart watch 2708 may internally process, alone or in cooperation with cloud-based resources, the cuff data along with thrust vector data to determine the equivalent distance traveled (e.g. 25 meter lap equivalents), calories burned, average equivalent water speed, stroke and kick frequency over time, and length or travel or strokes and kicks, and symmetry between left and right strokes and kicks.

Any of the foregoing data may be compared to reference data to provide interactive suggestions to the swimmer. For instance, over time, the swimmer's stretch or freestyle stroke length may shorten, which may prompt a visual message on the smart phone screen and/or an audible message requesting the swimmer to length his or her strokes. The same may be done for kicks which are too weak, slow, or out of sync with the arm strokes.

The application may thus report to the user performance metrics such as lap equivalents and calorie burn. A lap equivalent may be, for instance, a number of strokes which would be sufficient to traverse a 25 meter pool given the amount of horizontal reverse thrust exerted by the swim system over time. The laps may additionally be counted or verified by detecting the number of times the system regains a substantial vertical orientation during each turn maneuver, as described above.

The application may report to the user at the end of a swimming session the number of 25 meter laps the user would have completed if the user had been swimming in such a pool within the swim system. The application may also factor vertical thrust into its calculation of lap equivalents. For instance, greater upwards thrust generally makes swimming easier, and thus upwards thrust data may be used to adjust the lap equivalent count downwardly.

Turning to FIGS. 28A-28B and FIG. 29, two embodiments of VR/AR/MR snorkel mask assemblies for the swim system are illustrated. In some implementation, each of the snorkel mask assemblies 2800, 2900 can include a transparent shell portion 2802, 2902 configured to display computer-generated imagery (video/image data) from VR, AR, and/or MR systems to a user. In some embodiments, the transparent shell portion 2802, 2902 is made of transparent glass or plastic material that can include optical elements configured to display imagery associated with the swim system via near-eye display technology. In some examples, transparent shell portion 2802, 2902 allows the swimmer to use the snorkel mask assembly 2800, 2900 for swim sessions without VR/AR/MR features if desired. In addition, in some VR/AR/MR implementations, the user can simultaneously view real-world surroundings and system-generated VR/AR/MR imagery.

In some embodiments, the transparent shell portion 2802, 2902 is made of transparent glass or plastic material including a transparent or semi-transparent display layer adhered to the glass or plastic material that is configured to display VR/AR/MR imagery in response to receiving a control signal from VR/AR/MR controller 2822, 2922. In some examples, the display layer of the transparent shell portion is a flexible light emitting diode (LED) or organic LED (OLED) foil, film, or glaze that includes rows of LEDs embedded within the display layer that are configured to illuminate in colored pattern based on control signals received from controller 2822, 2922. In some embodiments, the display layer is a transparent liquid crystal display (LCD) film or foil. In some examples, controller housing 2820, 2920 can also house a projection device for projecting portions of the VR/AR/MR imagery onto the display layer. The display layer, in some examples, is made of an adhesive or self-adhesive film or foil configured to be easily applied to the transparent shell portion 2802, 2902 of the snorkel mask assembly 2800, 2900. In some implementations, the display layer can be configured to display the VR/AR/MR imagery on portions of the transparent shell portion 2802, 2902 in a full range of colors based on control signals received from controller 2822, 2922. In addition, the display layer can be made of a flexible material that provides for smooth application to curved surfaces of the transparent shell portion 2802, 2902. In some implementations, the transparent display portion 2802, 2902 that includes an applied display layer as described allows swim system users to view the real-world underwater environment and displayed VR/AR/MR imagery simultaneously which allows swim system users to observe their surroundings while also benefitting from the features of a VR/AR/MR experience.

In some examples, the transparent shell portion 2802, 2902 with the adhered transparent or semi-transparent display layer(s) may be transparent or translucent to allow a swimmer wearing the snorkel mask assembly 2800, 2900 to be able to see through the transparent shell portion 2802, 2902 to view the outside underwater environment without becoming disoriented or experiencing eye strain or vertigo. In some examples, the transparent shell portion 2802, 2902 may have light transmittances of greater than about 70%, 80%, 90%, or 95% when the display is active. In one example, the transmittance may be in range from about 50-60%, 60-70%, 70-80%, 80-90%, 90-100%, 70-90%, or 70-100% when the display is active. Throughout the disclosure, the terms "approximately," "about," "proximate," "minor variation," and similar terms generally refer to ranges that include the identified value within a margin of 20%, 10% or preferably 5% in certain embodiments, and any values therebetween.

A transparent or translucent shell portion 2802, 2902 allows swim system users to maintain situational awareness of the underwater environment while also obtaining the benefits of the VR/MR/AR features provided by the system. Particularly in an MR embodiment, the images depicted on the shell portion may relate to the environment in which the user is swimming. For instance, if a user is snorkeling in open water through a coral reef, the images may present interactive content concerning the reef or aquatic life typically found in that environment. In the pool environment, the displayed images may provide the appearance or illusion of a coral reef environment while at the same time permitting the user to see and focus on the pool wall or pool bottom if desired.

In some implementations, the breathing/snorkel-related features of snorkel mask assemblies 2800, 2900 can be configured as a full-face or partial face snorkel mask assembly. In a first embodiment shown in FIGS. 28A-28B, transparent shell portion 2802 of snorkel mask assembly 2800 includes a forward viewing section 2804 that interfaces with a half face inner shell 2806 that covers and seals the wearer's nose and mouth at interfacing surface 2814. Forward viewing section 2804 can include a flat viewing surface 2808 configured to align with a field of vision directly in front of a user's eyes when wearing the mask assembly 2800. In some examples, viewing surface 2808 extends a distance from a swimmer's face that allows the swimmer to view system-generated VR/AR/MR features displayed on the transparent shell portion 2802 without eye strain, blurriness or vertigo. The viewing section 2804 can also include side viewing section 2812 that forms a viewing surface that is peripherally adjacent to viewing surface 2808. Side viewing section 2812, in some embodiments, provides a surface for displaying system-generated VR/AR/MR features within the peripheral vision of the swimmer wearing the snorkel mask assembly 2800 during a swim session. In some examples, the viewing section 2804 has an upper viewing surface 2810 peripherally adjacent to an upper edge of viewing surface 2808 that provides an additional display surface for VR/AR/MR imagery in an upper peripheral viewing range of the swimmer. In some examples, VR/AR/MR imagery can be displayed in a direct field of vision at viewing surface 2808 and/or on one or more of the peripheral viewing surfaces 2810, 2812.

In a second embodiment of a snorkel mask assembly 2900 shown in FIG. 29, transparent shell portion 2902 has a spherical shape and interfaces with a half face inner shell 2906 that covers and seals the wearer's nose and mouth at interfacing surface 2908. In some implementations, the spherical transparent shell portion 2902 provides a continuous display surface for system-generated VR/AR/MR features that allows the swimmer to focus on displayed imagery without experiencing eye strain, blurriness, or vertigo. In addition, system-generated imagery can be displayed within a direct field of view and/or a peripheral field of view based on user settings and type of swim session.

In some examples, a radius of transparent shell portion 2902 of mask assembly 2900 and a distance of viewing surface 2808 of the transparent shell portion 2802 of mask assembly 2800 from a swimmer's eyes are based on a focal length that allows the swimmer to view system-generated VR/AR/MR imagery while swimming without experiencing eye strain, disorientation or vertigo. In some implementation, a forward surface of transparent shell portion 2902 or viewing surface 2808 of transparent shell portion 2802 is a distance from a wearer's eyes of about 3-12 in., 3-8 in., 4-9 in., 5-10 in., 5-8 in., 7-9 in., 6-12 in, 8-12 in., or 10-12 in.

In some implementations, swim mask assemblies 2800, 2900 can include controller housings 2820, 2920 for housing VR/AR/MR controllers, processors, and/or circuitry 2822, 2922 for controlling the display and/or generation of VR/AR/MR imagery on transparent display portions 2802, 2902. In some examples, the VR/AR/MR controller 2822, 2922 supplements the control functionality of swim system controller 2702 (FIG. 27). In some examples, the VR/AR/MR controller 2822, 2922 communicates with controller 2702 via wireless communication link (e.g., Wi-Fi, cellular, or Bluetooth link). The VR/AR/MR controller 2822, 2922 can generate VR/AR/MR imagery in response to receiving swim session sensor data from controller 2702. In some embodiments, the controller 2702 generates VR/AR/MR imagery and transmits imagery data to the VR/AR/MR controller 2822, 2922 for display on the transparent display portion 2802, 2902.

The VR/AR/MR controller 2822, 2922 interfaces with a corresponding swim system application on a smart phone or smart watch (e.g., smart watch 2708 in FIG. 27). The smart watch/smart phone application controller optionally interfaces with the same application but alternatively control of swim system basic functionality may be handled by a different application on the smart watch or smart phone than the more graphics-intensive VR/AR/MR and interactive training functionality. The user may select, via the smart watch or smart phone, the desired thrusts, times for which each thrust should be applied, target distance (actual or equivalent), target number of laps (actual or equivalent), the interactive training module or program. The swim system app, the VR/AR/MR controller 2822, 2922, or both, may determine calories burned, laps completed, distance traveled or any of the other performance metrics described herein. Audio feedback to the user may be provided from the smart watch, smart phone or VR/AR/MR controller 2822, 2922. Audio feedback may be provided by wired or wireless headphones or earbuds.

The VR/AR/MR controller 2822, 2922, controller 2702, and/or the smart watch 2708 can include motion detection modules to determine orientation, rate, and direction of movement, as is conventional. A position detection module of VR/AR/MR controller 2822, 2922 and/or controller 2702 optionally processes the accelerometer and inertial measurement unit (IMU) data in the manner described in U.S. Pat. No. 9,810,549, entitled "Systems, methods, and apparatus for calibration of and three-dimensional tracking of intermittent motion with an inertial measurement unit," and optionally computes the 3D position, speed and direction of the swim system and any smart watch 2708 worn by the swimmer according to the techniques described therein and/or the techniques described in U.S. Pat. No. 3,496,524, entitled "Doppler Sonar Navigation System Compensated for Sound Velocity Variations" and U.S. Pat. No. 3,891,960, entitled "Doppler Sonar System."

An interactive training module of VR/AR/MR controller 2822, 2922 or controller 2702 interfaces with the swim system applications on the smart watch and/or transparent display portion 2802, 2902 to present to the user an audio and/or video based interactive training experience and, optionally, a VR/AR/MR experience. For purposes of illustration, an embodiment in which an audio and visual VR/AR/MR experience is presented to the user. In other embodiments, only audio or only video is presented to the swimmer.

Using the position, speed and bearing data from one or more sensors on the snorkel mask assembly 2800, 2900 or sensors communicatively coupled to controller 2702 or on the reverse propulsion system, the swim system may be used, particularly in cooperation with an application running on the smart watch 2708 to provide enhanced training and interactive experiences. Positional data may be used to assess stroke frequency, stroke path, and conformance of the stroke to an optimal or reference stroke. The controller 2702, VR/AR/MR controller 2822, 2922, or controller on-board the smart watch 2708 may internally process, alone or in cooperation with cloud-based resources, the sensor data along with thrust vector data to determine the equivalent distance traveled (e.g. 25 meter lap equivalents), calories burned, average equivalent water speed, stroke and kick frequency over time, and length of travel or strokes and kicks, and symmetry between left and right strokes and kicks.

Any of the foregoing data may be compared to reference data to provide interactive suggestions to the swimmer. For instance, over time, the swimmer's stretch or freestyle stroke length may shorten, which may prompt a visual message on the transparent display portion 2802, 2902 and/or an audible message requesting the swimmer to length his or her strokes.

The same may be done for kicks which are too weak, slow, or out of sync with the arm strokes.

This system also enables the presentation to the swimmer of an immersive, interactive training experience as has become conventional for stationary bicycles. The transparent display portion 2802, 2902 and/or ear buds may be used to communicate interactive and encouraging professional instruction. The users may be presented, e.g., with video of dramatic underwater scenes taken from the perspective of a snorkeler while the coach, who may be videographically rendered as another swimmer swimming in front of the user, renders training advice and comments on marine wildlife reflected in the video footage. The system may also control repulsion system thrust and direction as appropriate to simulate a sprint or a temporary ocean current.

Still further, this system permits a full VR/AR/MR gaming experience in an underwater environment. The same techniques discussed above may be used to simulate a fictional underwater environment through which the user navigates and with which the user interacts. Sub-surface diving in such games can be accomplished by swimming downwards with arm strokes. The user may move toward the surface with appropriate flapping arm movements as a diver might use to surface. The VR/AR/MR application may also control thrust strength and direction as appropriate to reflect the VR/AR/MR environment, such as underwater waves or currents or to simulate being pushed back by the force of the current generated by a whale's flipper.

While certain embodiments have been described, these embodiments have been presented by way of example only and are not intended to limit the scope of the present disclosures. Indeed, the novel methods, apparatuses and systems described herein can be embodied in a variety of other forms; furthermore, various omissions, substitutions, and changes in the form of the methods, apparatuses, and systems described herein can be made without departing from the spirit of the present disclosures. The accompanying claims and their equivalents are intended to cover such forms or modifications as would fall within the scope and spirit of the present disclosures.

What is claimed is:

1. A reverse propulsion swimming apparatus configured for use in a pool comprising:
    mounting means configured to be worn about an upper torso of a swimmer; and
    repulsion means coupled to the mounting means such that the repulsion means is configured to be positioned centrally about the frontal upper torso of the swimmer, wherein the repulsion means is configured to provide in an aquatic environment reverse thrust towards and through regions adjacent each side of a head of the swimmer to counteract a forward propulsion provided by an arm stroke of the swimmer, the repulsion means being further configured to provide a variable reverse thrust selectable by the swimmer;
    wherein the repulsion means is further configured to provide reverse flow under both legs of the swimmer in a direction of the head of the swimmer.

2. The reverse propulsion swimming apparatus of claim 1, wherein the mounting means comprises a garment and a belt means.

3. The reverse propulsion swimming apparatus of claim 2, wherein the belt means includes two rigid clamshell portions hingedly coupled to a central portion that receives the repulsion means.

4. The reverse propulsion swimming apparatus of claim 1, wherein the repulsion means includes a central portion and two impeller units positioned laterally on either side of the central portion such that the impellers each have a thrust axis substantially aligned with the swimmer's legs or shoulders.

5. The reverse propulsion swimming apparatus of claim 1, further comprising adjustable buoyancy means coupled to the mounting means or repulsion means to provide varying degrees of lift to the upper torso of the swimmer.

6. The reverse propulsion swimming apparatus of claim 1, further comprising means for vectoring the thrust in different directions including downward when the swimmer is in a horizontal swimming position and laterally to left and right sides of the swimmer.

7. The reverse propulsion swimming apparatus of claim 1, further comprising orientation detection means configured to activate the thrust when the repulsion means is moved past a threshold angular orientation toward horizontal.

8. The reverse propulsion swimming apparatus of claim 1, further comprising supplemental removable buoyancy means provided on the mounting means or repulsion means.

9. The reverse propulsion swimming apparatus of claim 1, further comprising a snorkel adapted to permit the swimmer to inhale and exhale without turning his or her head to the side.

10. The reverse propulsion swimming apparatus of claim 1, wherein the swim apparatus is adapted to provide a swim environment in which the swimmer experiences a resistance equivalent to that experienced during normal swimming in the pool at a stroke speed that is slower than that used during said normal swimming.

11. A method of using a reverse thrust swimming apparatus in a pool, the method comprising:
    providing a swimming apparatus, the swimming apparatus comprising
        a mounting system adapted to be received about an upper torso of a swimmer; and
        a repulsion system coupled to the mounting system such that the repulsion system is positioned centrally about the frontal upper torso of the swimmer, wherein the repulsion system is configured to provide in an aquatic environment reverse thrust towards and through regions adjacent sides of a head of the swimmer to counteract a forward propulsion provided by an arm stroke of the swimmer, the repulsion system being further configured to provide a variable reverse thrust selectable by the swimmer;
        wherein the repulsion system is further configured to provide reverse flow under both legs of the swimmer in a direction of the head of the swimmer;
    donning, by the swimmer, the swimming apparatus;
    selecting, by the swimmer, a first reverse thrust; and
    swimming, by the swimmer, against the first reverse thrust such that the swimmer remains stationary in the pool.

12. The method of claim 11, wherein the mounting system comprises a garment and a belt system.

13. The method of claim 12, wherein the belt system includes two rigid clamshell portions hingedly attached to a central portion that receives the repulsion system.

14. The method of claim 11, wherein the repulsion system includes a central portion and two impeller units positioned laterally on either side of the central portion such that the impellers each have a thrust axis substantially aligned with the swimmer's legs or shoulders.

15. The method of claim 11, wherein the swim apparatus further comprises adjustable buoyancy means coupled to the mounting system or repulsion system to provide varying degrees of lift to the upper torso of the swimmer.

16. The method of claim 11, wherein the repulsion system further comprises means for vectoring the thrust in different directions including downwardly when the swimmer is in a horizontal swimming position and laterally to left and right sides of the swimmer.

17. The method of claim 11, wherein the swim apparatus further comprises orientation detection means configured to activate the first thrust when the repulsion system is moved past a threshold angular orientation toward horizontal.

18. The method of claim 11, wherein the swim apparatus further comprises supplemental removable buoyancy means provided on the mounting system or repulsion system.

19. The method of claim 11, wherein the swim apparatus further comprises a snorkel adapted to permit the swimmer to inhale and exhale without turning his or her head to the side.

20. The method of claim 11, wherein the swimmer experiences a resistance equivalent to that experienced during normal swimming in the pool at a stroke speed that is slower than that used during said normal swimming.

\* \* \* \* \*